(12) United States Patent
Krishnamurthy et al.

(10) Patent No.: US 12,247,782 B2
(45) Date of Patent: Mar. 11, 2025

(54) PRE-PURIFICATION ARRANGEMENT FOR AIR SEPARATION AND METHOD OF HYBRID AIR PURIFICATION

(71) Applicant: Air Products and Chemicals, Inc., Allentown, PA (US)

(72) Inventors: Gowri Krishnamurthy, Sellersville, PA (US); Dingjun Wu, Macungie, PA (US); Nasim Ul Hassan Malik, London (GB)

(73) Assignee: AIR PRODUCTS AND CHEMICALS, INC., Allentown, NJ (US)

( * ) Notice: Subject to any disclaimer, the term of this patent is extended or adjusted under 35 U.S.C. 154(b) by 576 days.

(21) Appl. No.: 17/482,826

(22) Filed: Sep. 23, 2021

(65) Prior Publication Data
US 2023/0087673 A1    Mar. 23, 2023

(51) Int. Cl.
*B01D 53/04* (2006.01)
*B01D 53/047* (2006.01)
*B01D 53/26* (2006.01)
*F25J 3/04* (2006.01)

(52) U.S. Cl.
CPC ...... *F25J 3/04242* (2013.01); *B01D 53/0407* (2013.01); *B01D 53/0462* (2013.01); *B01D 53/047* (2013.01); *B01D 53/261* (2013.01); *B01D 2257/108* (2013.01); *B01D 2257/404* (2013.01); *B01D 2257/502* (2013.01); *B01D 2257/504* (2013.01); *B01D 2257/702* (2013.01); *B01D 2257/80* (2013.01)

(58) Field of Classification Search
CPC ...... B01D 53/04; B01D 53/047; B01D 53/26; F25J 3/04
See application file for complete search history.

(56) References Cited

U.S. PATENT DOCUMENTS

| | | | |
|---|---|---|---|
| 4,472,178 | A | 9/1984 | Kumar et al. |
| 4,541,851 | A | 9/1985 | Bosquain et al. |
| 4,784,672 | A | 11/1988 | Sircar |
| 5,137,548 | A | 8/1992 | Grenier et al. |

(Continued)

FOREIGN PATENT DOCUMENTS

| | | |
|---|---|---|
| CA | 2357276 A1 | 3/2002 |
| DE | 102005023434 A1 | 12/2005 |
| KR | 1020140064836 | 5/2014 |

*Primary Examiner* — Sharon Pregler
(74) *Attorney, Agent, or Firm* — Matthew R. Weaver

(57) ABSTRACT

A method and apparatus for purifying air via a pre-purification unit (PPU) of an air separation unit (ASU) system can include passing air through a first adsorber of the PPU to purify the air for operation of the ASU system while it is at or below a first pre-selected operational capacity. In response to the operational capacity of the ASU system needing to be increased to a level above the first pre-selected operational capacity threshold, a second adsorber can be brought on-line in parallel with the first adsorber or in series with the first adsorber to provide improved purification capacity to account for the increased demand for purification capacity resulting from the increased operational capacity of the ASU system. This second adsorber can be different from the first adsorber (e.g. different in size, adsorption capacity for impurities within air, and/or configuration, etc.).

16 Claims, 8 Drawing Sheets

(56) References Cited

U.S. PATENT DOCUMENTS

| | | | |
|---|---|---|---|
| 5,232,474 | A | 8/1993 | Jain |
| 5,425,240 | A | 6/1995 | Jain et al. |
| 5,759,242 | A | 6/1998 | Smolarek et al. |
| 5,846,295 | A | 12/1998 | Kalbassi et al. |
| 5,914,455 | A | 6/1999 | Jain et al. |
| 5,917,136 | A | 6/1999 | Gaffney et al. |
| 6,086,656 | A | 7/2000 | Kohr et al. |
| 6,106,593 | A | 8/2000 | Golden et al. |
| 6,152,991 | A | 11/2000 | Ackley |
| 6,506,236 | B2 | 1/2003 | Golden et al. |
| 6,599,347 | B2 | 7/2003 | Kalbassi et al. |
| 6,866,075 | B2 | 3/2005 | Whitley et al. |
| 7,022,159 | B2 | 4/2006 | Kalbassi et al. |
| 7,264,651 | B2 | 9/2007 | Henzler et al. |
| 7,285,154 | B2 | 10/2007 | Karwacki, Jr. et al. |
| 7,413,595 | B2 | 8/2008 | Schmidt et al. |
| 8,206,669 | B2 | 6/2012 | Schaffer et al. |
| 8,262,783 | B2 | 9/2012 | Stoner et al. |
| 8,268,044 | B2 | 9/2012 | Wright et al. |
| 8,404,024 | B2 | 3/2013 | Henderson et al. |
| 8,518,356 | B2 | 8/2013 | Schaffer et al. |
| 8,734,571 | B2 | 5/2014 | Golden et al. |
| 8,814,985 | B2 | 8/2014 | Gerds et al. |
| 9,108,145 | B2 | 8/2015 | Kalbassi et al. |
| 9,199,190 | B2 | 12/2015 | Malik et al. |
| 9,631,864 | B2 | 4/2017 | Chen et al. |
| 9,731,241 | B2 | 8/2017 | Kalbassi et al. |
| 10,046,270 | B2 | 8/2018 | Harm et al. |
| 2011/0206581 | A1 | 8/2011 | Ackley et al. |
| 2011/0219950 | A1 | 9/2011 | Rodrigues et al. |
| 2012/0297978 | A1* | 11/2012 | Zhai .................. B01D 53/1493 95/149 |
| 2015/0375158 | A1 | 12/2015 | Lang et al. |
| 2019/0291078 | A1 | 9/2019 | Weist, Jr. et al. |

* cited by examiner

S1 Passing air through a first adsorber 200 of the PPU 107 to pass the air through a bed 221 of adsorbent material within a vessel 203 of the adsorber 200 during operation of the ASU that is at or below the first operational capacity threshold.

S2 In response to determining the operation of the ASU is needed to be adjust to a second operational capacity threshold that is above the first operational capacity threshold, adjusting flow of compressed air so that the a first portion of the air is passed to the first adsorber 200 and a second portion of the air is passed to the second adsorber 200 or so that the air output from the first adsorber 200 is also passed through a second adsorber 200 before being output as purified air. The second adsorber is different than the first adsorber.

S3 In response to determining that the operation of the ASU can be reduced to below the first operational capacity threshold or at the first operational threshold, adjusting the flow of air so that the air is passed through the first adsorber and is no longer passed through the second adsorber until the operational capacity of the ASU needs to be adjusted to a level above the first operational capacity threshold and at or below a second higher operational capacity threshold.

FIG. 8

PRE-PURIFICATION ARRANGEMENT FOR AIR SEPARATION AND METHOD OF HYBRID AIR PURIFICATION

FIELD OF THE INVENTION

The present innovation relates to air separation systems, pre-purification unit arrangements utilizable in such systems, adsorbers for purification of air in air separation systems, and methods of making and using the same.

BACKGROUND OF THE INVENTION

Thermal Swing Adsorption (TSA) is frequently used alongside technology like Pressure Swing Adsorption (PSA) as pre-purification for air cryogenic distillation processes. TSA's function is to remove components with high freezing points such as ambient moisture (e.g. water vapor, $H_2O$) and carbon dioxide ($CO_2$) which would otherwise freeze out in downstream processing, causing operability issue like blockage. Nitrous oxide ($N_2O$), hydrocarbons and other impurities can also be removed via front-end purification to avoid these impurities from accumulating in downstream processes.

Purification units often utilize adsorbers, which typically come in four different common configurations: vertical, vertical cross flow, horizontal and radial. Examples of these types of adsorbers, TSA systems and PSA systems can be appreciated from U.S. Pat. Nos. 4,472,178, 4,541,851, 4,784,672, 5,137,548, 5,232,474, 5,425,240, 5,759,242, 5,846,295, 5,914,455, 5,917,136, 6,086,659, 6,106,593, 6,152,991, 6,506,236, 6,599,347, 6,866,075, 7,022,159, 7,264,651, 7,285,154, 7,413,595, 8,206,669, 8,262,783, 8,268,044, 8,404,024, 8,518,356, 8,734,571, 8,814,985, 9,108,145, 9,199,190, 9,631,864, and 9,731,241, U.S. Pat. App. Pub. Nos. 2011/0206581, 2011/0219950 and 2019/0291078 and Canadian Patent Publication No. 2,357,276 A.

SUMMARY

We determined that air separation unit (ASU) systems often experience air purification capacity problems when the ASU is to operate at a higher than normal operational capacity. For example, we determined that there is no easy way to increase adsorption system's capacity by a significant amount (e.g. 10%-20%) to account for a situation where an ASU system may need to operate at a higher than normal capacity to account for different issues an operator may experience (e.g. increase in production demand, increase in demand for oxygen or nitrogen flows for other plant processes, etc.). For instance, conventionally a 10%-20% higher feed air flow fed into the ASU system without making changes to the adsorption system of the ASU system's purification unit will result in $CO_2$ and $N_2O$ breakthrough from the purification unit downstream into the separation columns of the ASU. $CO_2$ breakthrough can be immediate threat to safety and operation. In addition, a higher pressure drop will exist across the adsorbent bed of the adsorber system used in the purification system due to the higher flowrate, which will result in higher power cost. Additionally, in case of a radial vessel where perforated screens are used to separate the adsorbent layers, the higher flow can result in a higher gas velocity that can cause undesired damage to the adsorbent material (e.g. particle attrition) within the adsorbent bed of the adsorber and can also lead to undesired dust formation in the adsorber.

Conventionally, an ASU system is often designed to address an increased operational demand that uses a higher feed air flow by use of a set of larger adsorbers having larger beds so more adsorbent material can be contained in the vessels to accommodate the higher capacity operational flows. However, we have determined that this approach has significant drawbacks. For instance, the use of larger adsorbers can incur higher capital costs and also can incur higher operational costs to account for the use of the larger adsorbent material beds.

Another conventional approach to address this issue is to use two sets of adsorption vessels each having a similar flowrate of air fed through them by splitting the air flow across multiple adsorbers of the same type, size and adsorbent bed configuration. We have determined that this approach also results in high capital cost, and additionally needs complicated control schemes to balance the flow of air passing through the multiple adsorbers operating in parallel with the same flow rates of air passing through the adsorbers.

We have determined that the conventional approaches for addressing higher operational capacity issues associated with the purification system of an ASU system also can incur other problems. For example, typically, there is a limited number of readily available adsorption vessel sizes to choose from for use in a purification system. The bed of one size larger adsorber may have too much extra volume for a particular design, which will have higher vessel cost and higher adsorbent cost and be unsuitable. However, in other situations, the multiple adsorber system will be significantly more expensive than a single adsorber system.

The conventional approaches also have significant issues related to retrofitting of a pre-existing purification system to upgrade the purification system of an ASU system. For example, for a retrofit operation, there may not be sufficient space for more adsorbent material in the existing bed(s) of the adsorber(s). Also, there can be a limit on gas velocity to avoid adsorbent particle damage. Moreover, a total replacement to a set of larger adsorbers may also be significantly expensive and then also incur the above noted problems associated with use of these larger sized adsorbers.

We have determined that none of the conventional solutions leverage the practical limitation that many plants do not need to operate at 100% capacity year-round. Also, these conventional solutions can involve complicated retrofit implementations as they can require designing customized adsorber vessels beforehand. Further, these conventional solutions can require the development and deployment of vessels of rare sizes that can be hard to source or can be extremely expensive by requiring customized sizing. We have determined that a new approach is needed that can provide significant cost savings, is operationally flexible and can be suitable for both new and retrofit situations. We have also determined that a new approach that can limit the number of vessel size variations to be implemented in the field can be desired as this can avoid use of expensive custom sized adsorbers or hard to source adsorbers that may be of significantly higher cost than more readily available options. Embodiments of a purification system, ASU, and method of operating and retrofitting an ASU utilizing our new approach can address these issues and enable enhancing the feed capacity of air separation purification systems.

For example, embodiments of our purification system can be designed to provide a pre-purification unit (PPU) of an ASU system that can permit flexible operation to account for increased operational capacity demands of the ASU while also permitting utilization of more commonly available adsorber vessels for the PPU, which can provide reduced capital costs as well as provide improved sourcing ability for obtaining such vessels. Embodiments can also avoid requiring use of complex flow control systems that try and ensure similar and uniform flow rates of air through multiple different adsorbers.

The extra amount of feed air that can be provided to the ASU system for increasing the operational capacity of the ASU system to a level that is in excess of a first pre-selected operational capacity can come from a separate second supplemental air compressor system or by increasing output from the existing first air compressor system. The feed air that is generated via the compression system(s) can be enough to meet the total product need. When operating at a second operational capacity level, the feed rate of air provided by the compression system(s) can be an elevated second feed rate of air that is above a first feed flow rate of air that is at a first pre-selected feed rate within a first pre-scribed air feed rate range that corresponds to the first pre-selected operational capacity.

In some embodiments, a PPU can include a first set of adsorbers that can include a first adsorber and a second adsorber. The second adsorber can be different from the first adsorber. For example, the type of the adsorber for the second adsorber can differ (e.g. be a vertical adsorber instead of a radial adsorber when the first adsorber is a radial adsorber, etc.). As another example, the second adsorber can have a smaller size than the first adsorber, a different amount of adsorbent material, a different sized adsorbent material bed. As yet another example, two or more of the following parameters may differ so that the second adsorber is different from the first adsorber: (i) the type of adsorber and (ii) the size of the adsorber, (iii) size of the bed of adsorbent material, (iv) composition of adsorbent material within the adsorber's bed of adsorbent material. In many embodiments, the second adsorber can be substantially smaller than the first adsorber as well as being of a different type, for example. For instance, the second adsorber can be a vertical adsorber having a smaller capacity than the first adsorber, which can be a radial adsorber.

Embodiments of the PPU, ASU having the PPU, and methods of retrofitting an ASU and operating the PPU of an ASU can be designed so that during operation within a first pre-selected operational capacity (e.g. up to 70% operational capacity of the ASU, up to 80% of the operational capacity of the ASU, up to 85% of the operational capacity of the ASU, etc.), the PPU is operated to utilize the first adsorber for purification of compressed air before that purified compressed air is fed downstream into the ASU for undergoing cooling and separation. The first pre-selected operational capacity can be selected to account for normal operational conditions for the ASU for a majority of time. A second pre-selected operational capacity that is higher than this first operational capacity can also be defined to account for times when the ASU or PPU may need to operate at elevated capacities, which require use of higher flow rates of air passing through the PPU. In response to determining that the operational capacity of the ASU or the PPU of the ASU is to be increased above the first pre-selected operational capacity (e.g. within the higher second pre-selected operational capacity, which can be, as non-limiting examples, between 70% and 100% capacity, above 80% operational capacity, above 90% operational capacity, at or above 90% operational capacity, etc.), the second adsorber can be brought on-line to receive at least a portion of the air for purifying that air to provide increased purification capacity.

In some situations, the second adsorber can be brought online (or on-stream) in response to the determination that the PPU is to operate above the first pre-selected operational capacity so it operates in parallel with the first adsorber. In such situations, the first adsorber can receive a first portion of the overall air flow that is over 50% of the feed air flow fed to the PPU for undergoing purification (e.g. up to 60%-70% of the feed air flow fed to the PPU for purification, at least 70% of the air flow fed to the PPU for purification, at least 80% of the air flow fed to the PPU for purification, etc.) at the elevated second operational capacity while the second adsorber receives a second portion of the air flow that can be less than 50% of the overall air fed to the PPU for purification (e.g. up to 40% of the feed air flow, up to 30% of the feed air flow, up to 20% of the feed air flow, etc.).

In other situations, the second adsorber can be brought online in response to the determination that the PPU is to operate above the first pre-selected operational capacity so it operates in series with the first adsorber. In such situations, the first adsorber can receive the entirety of the air flow fed to the PPU for undergoing purification at the elevated second operational capacity. The second adsorber can be positioned downstream of the first adsorber to receive the entirety of the air flow output from the first adsorber to further purify that air flow to avoid undesired $CO_2$ or $N_2O$ breakthrough from the PPU while it operates that the higher second pre-selected operational capacity.

Embodiments can be designed so that when the operational capacity demand for the PPU is decreased back to within the first pre-selected operational capacity, the second adsorber can be brought off-line so that it no longer processes compressed feed air for purification. The second adsorber can then be brought back on-line to operate with the first adsorber the next time the PPU and/or ASU is to operate above the first pre-selected operational capacity.

We have determined that embodiments we have developed can provide operational flexibility that can also avoid increased operational costs and also permit an operator to incur lower overall capital costs to account for the increased operational capacity a plant may experience from time to time. Moreover, embodiments can be utilized so that both the first and second adsorbers can be sized to permit more readily available, conventionally sized adsorber vessels to be utilized, which can provide reduced costs and also allow for better sourcing options for an operator of an ASU or a plant having an ASU.

In some preferred embodiments, the first adsorber of the PPU can be a radial adsorber of a first size and first capacity and the second adsorber is a vertical adsorber of a second size and second capacity and the second size can be less than the first size of the first adsorber and the second capacity of can be smaller than the first capacity of the first adsorber. In such embodiments, the second adsorber, as a vertical adsorber, can also be sized so that its adsorbent bed is smaller but is retained within a larger vessel so that the adsorbent bed within the vessel of the second adsorber can be increased with additional adsorbent material to also account for additional increases in capacity that may be needed in the future as the adsorbent bed of a vertical adsorber is more easily adjusted than an adsorbent bed of a radial adsorber.

Embodiments of the PPU can be configured to utilize multiple sets of adsorbers. When one set of adsorbers is on-line to provide purification, the other set can be off-line to undergo regeneration. In such embodiments, a first adsorber of the first set of adsorbers can always be online and the second adsorber of the first set can be optionally be on-line depending on whether the PPU is operating at the first operational capacity (e.g. second adsorber is not on-line and not used to provide purification) or the second operational capacity (e.g. second adsorber is on-line and utilized to provide purification). When the second set of adsorbers is on-line and the first set of adsorbers is off-line, the first set of adsorbers can undergo regeneration and the second set of adsorbers can be used to purify air so that a first adsorber of the second set of adsorbers is always on-line and the second adsorber of the second set of adsorbers is brought online when the PPU is operating within the second pre-selected operational capacity and is not utilized when the PPU is operating at the first pre-selected operational capacity. It should be appreciated that the first and second adsorbers of the second set of adsorbers can also be referred to as a third adsorber and a fourth adsorber of the PPU instead of being referred to as the first adsorber of the second set of adsorbers and a second adsorber of the second set of adsorbers.

A method of operating a pre-purification unit (PPU) of an air separation unit (ASU) system can include purifying air fed to the PPU via a first adsorber of the PPU while the ASU system operates within a first pre-selected operational capacity. In response to an increase in the operational capacity of the ASU system to a level that is above the first pre-selected operational capacity, the air fed to the PPU can be purified via the first adsorber of the PPU and a second adsorber of the PPU. The second adsorber of the PPU being different from the first adsorber of the PPU.

In some embodiments, the first adsorber can be a radial adsorber of a first purification capacity and the second adsorber can be a vertical adsorber of a second purification capacity that is lower than the first purification capacity. In other embodiments, the first adsorber can be a radial adsorber of a first size or purification capacity and the second adsorber can be a radial adsorber of a different size or purification capacity.

The purifying of the air fed to the PPU via the first adsorber of the PPU and the second adsorber of the PPU can be arranged in a number of different ways. For instance, in a first aspect the purifying of the air fed to the PPU via the first adsorber of the PPU and the second adsorber of the PPU can include splitting a flow of air fed to the PPU so that a first portion of the air is fed to the first adsorber and a second portion of the air is fed to the second adsorber. The second portion can be smaller than the first portion. For example, the first portion can be 60% to 80% of the flow of air fed to the PPU and the second portion can be 40% to 20% of the flow of air fed to the PPU. As another example, the first portion can be 60% to 90% of the flow of air fed to the PPU and the second portion can be 40% to 10% of the flow of air fed to the PPU. As yet another example, the first portion can be 65% to 85% of the flow of air fed to the PPU and the second portion can be 35% to 15% of the flow of air fed to the PPU.

In a second aspect, the purifying of the air fed to the PPU via the first adsorber of the PPU and the second adsorber of the PPU can include passing the air fed to the PPU to the first adsorber and subsequently passing at least partially purified air output from the first adsorber to the second adsorber to undergo further purification via the second adsorber such that the first adsorber and the second adsorber operate in series. The entirety of air fed to the first adsorber can then be fed to the second adsorber for embodiments of this in series operational arrangement. Embodiments utilizing an in series arrangement of adsorbers can include adjusting a flow of air within the PPU so that air output from the first adsorber is fed to the second adsorber. This can occur, for example, when the PPU is operating (or is to be operating) at its second pre-selected operational capacity. Adjustment so that only air fed to the PPU is passed through the first adsorber can also be made when the PPU is to be operated at its first pre-selected operational capacity and is below its second pre-selected operational capacity.

Embodiments can also include increasing a flow rate of air fed to the PPU via increasing an operational capacity of a first compression system of the ASU system. Such increase in flow rates can result in operation of the ASU system and/or PPU at a higher operational capacity. For instance, such an adjustment can be provided when the PPU is to operate at its second pre-selected operational capacity.

Embodiments can be arranged so that the PPU includes a first set of adsorbers that include the first adsorber and the second adsorber and also include a second set of adsorbers that include a third adsorber and a fourth adsorber. Other embodiments can be arranged so that the first set of adsorbers includes the first adsorber and the second adsorber and a second set of adsorbers includes a third adsorber and the second adsorber. In such embodiments, the second adsorber can be a common supplemental adsorber that can be brought on-line for use when the PPU is operating at its second pre-selected operational capacity.

Embodiments of the method can also include passing regeneration gas through a second set of adsorbers while in an off-line state while the first set of adsorbers are in an on-line state. The regeneration gas can pass through the third and fourth adsorbers of a second set of adsorbers when a first set of adsorbers that includes the first and second adsorbers is on-line. As another example, the regeneration gas can pass through the second and third adsorbers of a second set of adsorbers when the first adsorber is on-line and the PPU is operating within its first pre-selected operational capacity for embodiments that are arranged so the second adsorber is a common supplemental adsorber of the first set of adsorbers and the second set of adsorbers.

Embodiments can be configured so that, in response to a decrease in the operational capacity of the ASU system to a level that is at or below the first pre-selected operational capacity, adjusting flow of air fed to the PPU is performed so that air is only fed to the first adsorber for purifying the air fed to the PPU via the first adsorber and the second adsorber no longer receives air for purifying the air while the operational capacity is at or below the first pre-selected operational capacity.

The first and second adsorbers can each include material beds for removal of one or more impurities within the air. The material beds can have similar compositions of material or different compositions of material. For example, in some embodiments, the first adsorber can be configured to remove one or more of water, carbon dioxide ($CO_2$), nitrous oxide ($N_2O$), and hydrocarbons from the air and the second adsorber is configured to remove one or more of carbon monoxide (CO) and hydrogen ($H_2$) from the air. As another example, some embodiments can be configured so that the first adsorber is configured to remove one or more of water, $CO_2$, $N_2O$, and hydrocarbons from the air and the second adsorber is configured to remove one or more of $CO_2$ and $N_2O$ remaining in the air output from the first adsorber. In other embodiments (e.g. embodiments in which the on-line adsorbers may operate in parallel), the adsorbent bed material compositions can be similar and can be configured to each remove one or more of water, $CO_2$, $N_2O$, hydrocarbons, CO, and $H_2$ from the air.

A pre-purification unit (PPU) for an air separation unit (ASU) system is also provided. The PPU can include a first adsorber and a second adsorber that is different from the first adsorber. The second adsorber can be positioned relative to the first adsorber so that when the ASU system operates at or below a first pre-selected operational capacity air fed to the PPU for purification is passed through the first adsorber and, in response to an increase in the operational capacity of the ASU system to a level that is above the first pre-selected operational capacity, air fed to the PPU for purification is passed to the first adsorber and to the second adsorber.

Embodiments of the PPU can be configured to implement an embodiment of the method operating a PPU of an ASU system. Examples of such methods include embodiments of the method discussed herein.

Some embodiments of the PPU can be arranged so that the second adsorber is positioned to operate in parallel with the first adsorber so that a first portion of the air is fed to the first adsorber and a second portion of the air is fed to the second adsorber when the operational capacity of the ASU system is above the first pre-selected operational capacity. The second portion of the air fed to the PPU can be smaller than the first portion of the air fed to the PPU.

For example, the first portion can be 60% to 80% of the flow of air fed to the PPU and the second portion can be 40% to 20% of the flow of air fed to the PPU. As another example, the first portion can be 60% to 90% of the flow of air fed to the PPU and the second portion can be 40% to 10% of the flow of air fed to the PPU. As yet another example, the first portion can be 65% to 85% of the flow of air fed to the PPU and the second portion can be 35% to 15% of the flow of air fed to the PPU.

Other embodiments of the PPU can be arranged so that the second adsorber is positioned to operate in series with the first adsorber so that air output from the first adsorber is subsequently fed to the second adsorber for being purified when the operational capacity of the ASU system is above the first pre-selected operational capacity. For instance, the first adsorber and second adsorber can be positioned and in fluid communication with each other so that an entirety of the air is passed through the first adsorber and the second adsorber when the operational capacity of the ASU system is above the first pre-selected operational capacity. Partially purified air output from the first adsorber can be subsequently fed to the second adsorber, for example.

The first and second adsorbers can be different from each other based on size, purification capacity, type or other ways. For instance, the first adsorber can be a radial adsorber and the second adsorber can be a vertical adsorber. As another example, the first adsorber can be a radial adsorber of a first size and a first purification capacity and the second adsorber can be a radial adsorber of a second size that is smaller than the first size and first purification capacity.

The PPU can be arranged to utilized multiple sets of adsorbers. In some embodiments, a first set of adsorbers of the PPU include the first adsorber and the second adsorber and a second set of adsorbers of the PPU include a third adsorber and a fourth adsorber. In other embodiments, the first set of adsorbers of the PPU include the first adsorber and the second adsorber and the second set of adsorbers of the PPU include a third adsorber and the second adsorber. In such embodiments, the second adsorber can be a common supplemental adsorber that can be brought on-line when the PPU is to operate at its second pre-selected operational capacity when the first adsorber or the third adsorber is in an on-line state. In such embodiments, the second adsorber can be different from the third adsorber as well as being different from the first adsorber.

In some embodiments of the PPU, the PPU includes a second set of adsorbers that include a third adsorber and a fourth adsorber where the fourth adsorber is different from the third adsorber. In such embodiments, the second set of adsorbers can be positioned to be adjustable from an off-line state to an on-line state, the second set of adsorbers being positionable in the off-line state while the first set of adsorbers are in an on-line state and the second set of adsorbers are also positionable in the on-line state to purify air fed to the PPU when the first set of adsorbers are in an off-line state. The fourth adsorber can be positioned relative to the third adsorber so that when the ASU system operates at or below a first pre-selected operational capacity air fed to the PPU for purification is passed through the third adsorber when the second set of adsorbers is in the on-line state and, in response to an increase in the operational capacity of the ASU system to a level that is above the first pre-selected operational capacity while the second set of adsorbers is in the on-line state, air fed to the PPU for purification is passed to the third adsorber and to the fourth adsorber. In some of these embodiments, the third adsorber can be a radial adsorber and the fourth adsorber can be a vertical adsorber and/or the fourth adsorber can have a smaller purification capacity than the third adsorber.

Embodiments of the PPU can be arranged so that the first adsorber is configured to remove one or more of water, carbon dioxide ($CO_2$), nitrous oxide ($N_2O$), and hydrocarbons from the air and the second adsorber is configured to remove one or more of carbon monoxide (CO) and hydrogen ($H_2$) from the air. In other embodiments, the first adsorber can be configured to remove one or more of water, $CO_2$, $N_2O$, and hydrocarbons from the air and the second adsorber can be configured to remove one or more of $CO_2$ and $N_2O$ remaining in the air output from the first adsorber. In yet other embodiments of the PPU, the first and second adsorbers can each be configured to remove one or more of water, $CO_2$, $N_2O$, hydrocarbons, CO, and $H_2$ from the air.

An air separation unit (ASU) system is also provided. Embodiments of the ASU system can include a compression system in fluid connection with a pre-purification system that has a PPU. The ASU system can also include a main heat exchanger positioned to receive purified air from the PPU and output at least one cooled purified air flow and an air separation column positioned to receive cooled the at least one cooled purified air flow from the main heat exchanger. The PPU can include an embodiment of the PPU discussed herein, for example. For instance, the PPU can include a first adsorber and a second adsorber that is different from the first adsorber. The second adsorber can be positioned relative to the first adsorber so that when the ASU system operates at or below a first pre-selected operational capacity air fed to the PPU for purification via the compression system is passed through the first adsorber and, in response to an increase in the operational capacity of the ASU system to a level that is above the first pre-selected operational capacity, air fed to the PPU for purification is passed to the first adsorber and to the second adsorber.

Embodiments of the ASU can be configured so that the second adsorber is positioned to operate in parallel with the first adsorber so that a first portion of the air fed to the PPU is fed to the first adsorber and a second portion of the air fed to the PPU is fed to the second adsorber when the operational capacity of the ASU system is above the first pre-selected operational capacity. The second portion of the air fed to the PPU can be smaller than the first portion of the air fed to the PPU. For example, the first portion of the air fed to the PPU can be 60%-80%, 60%-90%, or 65%-85% of a flow of the air fed to the PPU and the second portion of the air fed to the PPU can be 40%-20%, 40%-10%, or 15%-35% of the flow of the air fed to the PPU.

Other embodiments of the ASU system can be arranged so that the second adsorber is positioned to operate in series with the first adsorber so that air output from the first adsorber is subsequently fed to the second adsorber for being purified when the operational capacity of the ASU system is above the first pre-selected operational capacity. The first adsorber and the second adsorber can be positioned and in fluid communication with each other so that an entirety of the air fed to the PPU is passed through the first adsorber and the second adsorber when the operational capacity of the ASU system is above the first pre-selected operational capacity.

In some embodiments, the first adsorber of the ASU system can be configured to remove one or more of water, carbon dioxide ($CO_2$), nitrous oxide ($N_2O$), and hydrocarbons from the air and the second adsorber can be configured to remove one or more of carbon monoxide (CO) and hydrogen ($H_2$) from the air. In other embodiments, the first adsorber can be configured to remove one or more of water, $CO_2$, $N_2O$, and hydrocarbons from the air and the second adsorber can be configured to remove one or more of $CO_2$ and $N_2O$ remaining in the air output from the first adsorber. In yet other embodiments of the ASU system, the first adsorber and the second adsorber can each be configured to remove one or more of In some embodiments of the ASU system in which the PPU includes a first set of adsorbers that include the first adsorber and the second adsorber, the PPU can also include a second set of adsorbers including a third adsorber and a fourth adsorber where the fourth adsorber is different from the third adsorber. The fourth adsorber can be positioned for operation in series with the third adsorber or positioned for operation in parallel with the third adsorber. The second set of adsorbers can be positioned to be adjustable from an off-line state to an on-line state. The second set of adsorbers can be positionable in the off-line state while the first set of adsorbers are in an on-line state and the second set of adsorbers can be positionable in the on-line state to purify air fed to the PPU when the first set of adsorbers are in an off-line state. The fourth adsorber can be positioned relative to the third adsorber so that when the ASU system operates at or below a first pre-selected operational capacity air fed to the PPU for purification via the compression system is passed through the third adsorber when the second set of adsorbers is in the on-line state and, in response to an increase in the operational capacity of the ASU system to a level that is above the first pre-selected operational capacity while the second set of adsorbers is in the on-line state, air fed to the PPU for purification is passed to the third adsorber and to the fourth adsorber. In some of these embodiments, the third adsorber can be a radial adsorber and the fourth adsorber can be a vertical adsorber and/or the fourth adsorber can have a smaller purification capacity than the third adsorber.

Other details, objects, and advantages of our air separation systems, adsorbers, pre-purification systems utilizing adsorbers and methods of making and using the same will become apparent as the following description of certain exemplary embodiments thereof proceeds.

BRIEF DESCRIPTION OF THE DRAWINGS

Exemplary embodiments of air separation systems, pre-purification systems utilizing multiple adsorbers and methods of making and using the same are shown in the drawings included herewith. It should be understood that like reference characters used in the drawings may identify like components.

FIG. 8 is a flow chart of an exemplary method of purifying air via a PPU of an air separation unit system. The exemplary embodiment of the ASU system 1 shown in FIG. 1 and the exemplary embodiments of the pre-purification systems 3 shown in FIGS. 2 and 3 can utilize the exemplary embodiment of the method illustrated in FIG. 8.

DETAILED DESCRIPTION

Figure 5:
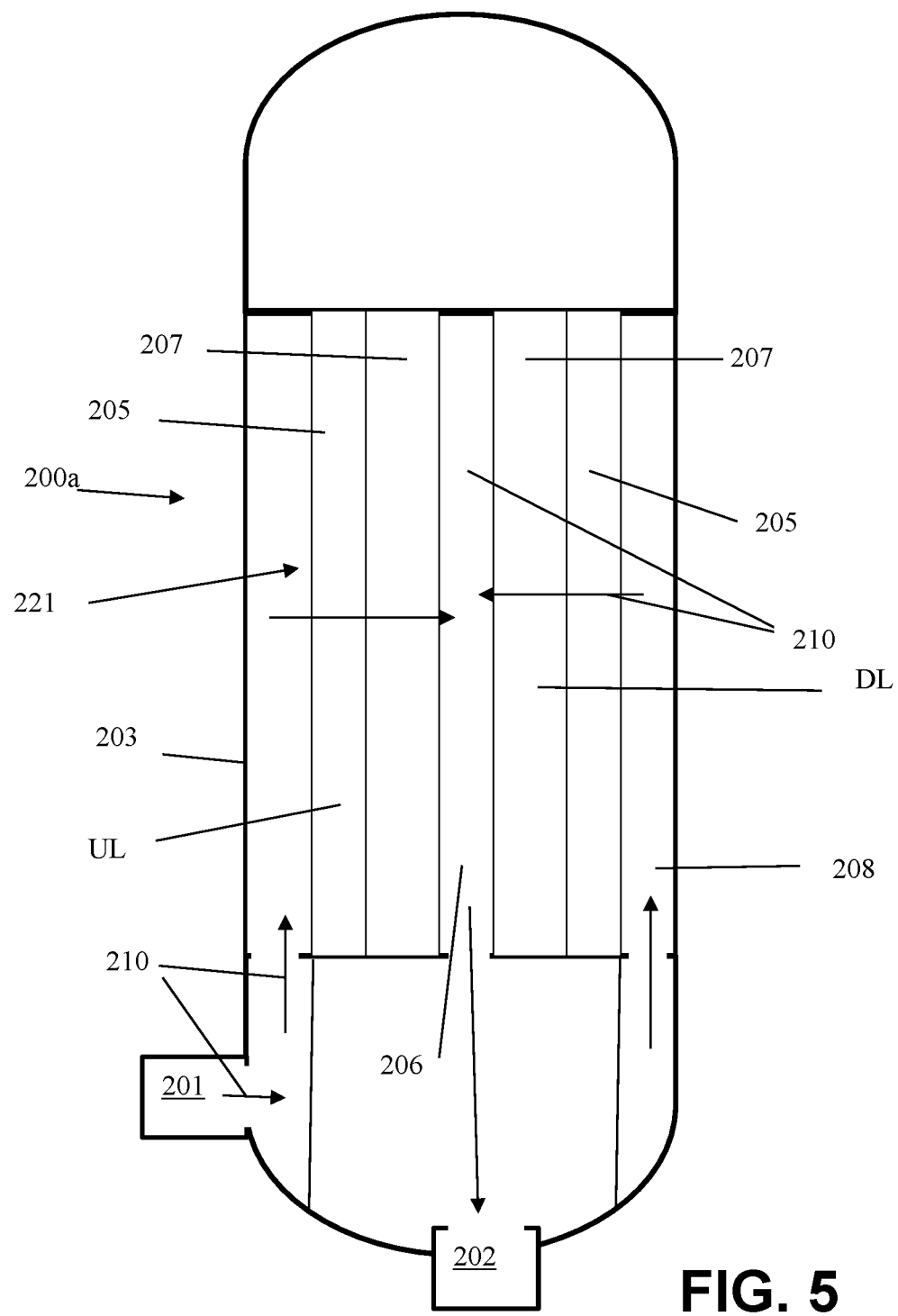
FIG. 5 is a schematic view of a second exemplary embodiment of an adsorber 200 that can be included in the PPU 107 of the pre-purification system 3 of the first exemplary embodiment of the ASU system 1. The exemplary adsorber 200 illustrated in FIG. 5 can be utilized in the first or second exemplary embodiment of the PPU 107 shown in FIGS. 2 and 3, for example.
Figure 6:
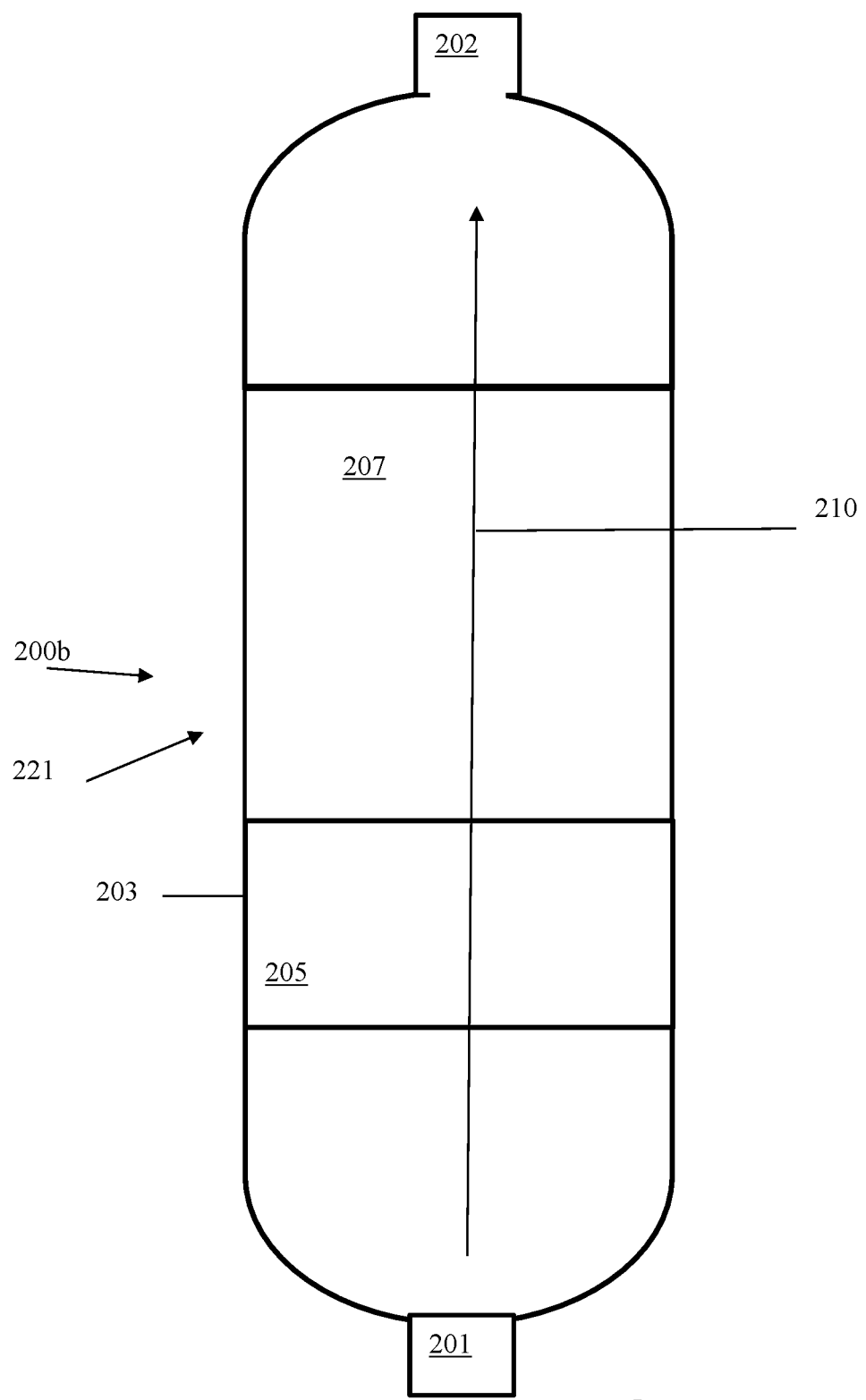
FIG. 6 is a schematic view of a third exemplary embodiment of an adsorber 200 that can be included in the PPU 107 of the pre-purification system 3 of the first exemplary embodiment of the ASU system 1. The exemplary adsorber 200 illustrated in FIG. 6 can be utilized in the first or second exemplary embodiment of the PPU 107 shown in FIGS. 2 and 3, for example.
Figure 7:
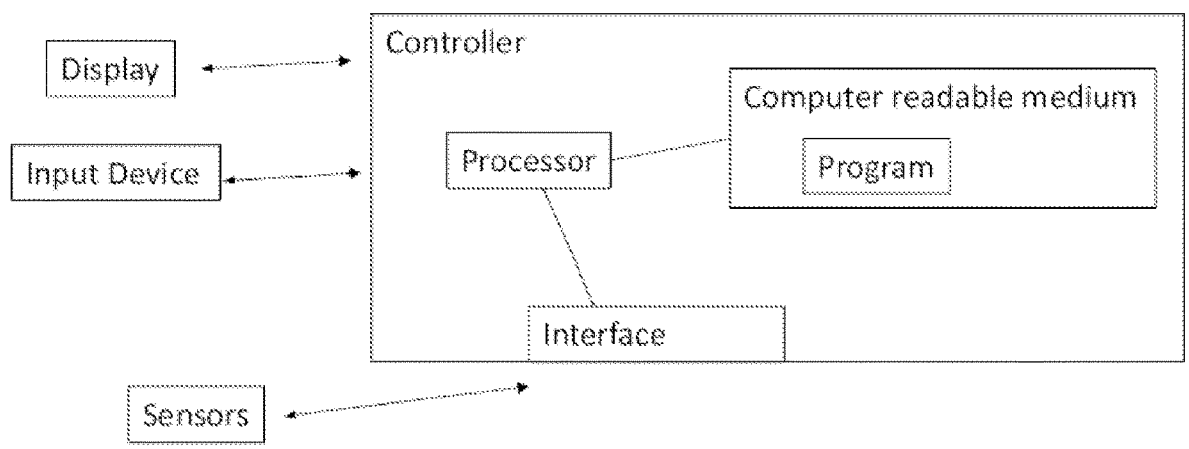
FIG. 7 is a block diagram of an exemplary controller that can be utilized in the first exemplary embodiment of the ASU system 1, in the first exemplary embodiment of the pre-purification system 3 shown in FIG. 2, or in the second exemplary embodiment of the pre-purification system 3 shown in FIG. 3.

Referring to FIGS. 1-8 a plant can include an air separation unit (ASU) system 1. The ASU system 1 can be configured as a cryogenic air distillation system for generation of one or more output flows for providing one or more desired products (e.g. oxygen gas, and/or liquid oxygen, and/or nitrogen gas, and/or liquid nitrogen, and/or argon gas, and/or argon liquid, and/or other fluid flows, etc.). In some embodiments, the ASU system 1 can be a plant. In other embodiments, a plant can include the ASU system 1 as a component of a larger facility that includes one or more other industrial processes. For example, the plant that includes the ASU system 1 can be a power plant, a manufacturing facility, or other type of plant. Embodiments of the plant or ASU system 1 can utilize a controller to help monitor and/or control operations of the plant and/or ASU system 1. An example of such a controller is illustrated in FIG. 7.

The ASU system 1 can be configured to include a pre-purification system 3 configured to purify an intake flow of air to remove impurities from the air for feeding to an air separation column 5 for separation of the air into one or more product flows of fluid and one or more waste flows of fluid. For example, in some embodiments, the ASU product flows may only include at least one flow of nitrogen, at least one flow of oxygen, or a combination of at least one product flow of nitrogen and at least one product flow of oxygen. In other embodiments, there may be other product flows such as argon, xenon, and/or krypton in addition to product flows of nitrogen and/or oxygen. There can also be at least one waste flow generated from the air separation column 5 or the ASU. The waste flows can be emitted to atmosphere and/or used in one or more other plant processes.

The air separation column 5 can include a multiple column assembly 111 that includes a low pressure column 111a positioned above a high pressure column 111b. A reboiler-condenser 111c can be positioned between the high pressure column 111b and the low pressure column 111a in the multiple column tower arrangement. The high pressure column 111b can be considered a first column that operates at a highest pressure of the columns of the multiple column tower assembly 111. For instance, the high pressure column 111b can operate at a pressure that is higher than the operational pressure of the low pressure column 111a. The low pressure column 111a can be considered a second column of the multiple column assembly.

In some embodiments, the low pressure column 111a can operate at a pre-selected operational pressure that is within a range of 1.1-5 atm, 1.1-3 atm or at a pressure that is greater than 1 bar and less than 5 bar or yet another suitable range. The high pressure column 111b can operate at a pressure within a range of 4.5-15 atm, or at a pressure that is greater than 4 bar and less than 15 bar or yet another suitable range.

Figure 1:
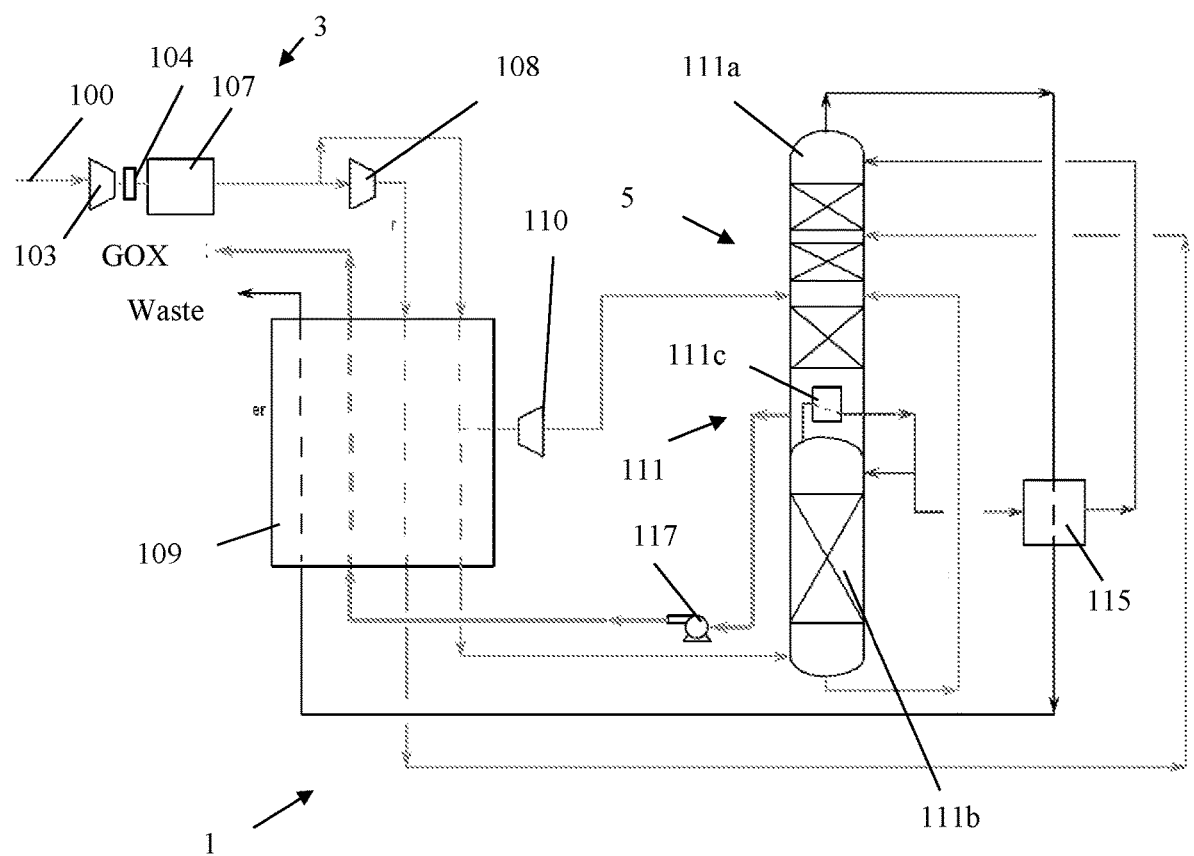
FIG. 1 is a box diagram of a first exemplary embodiment of an air separation unit (ASU) system 1 utilizing an exemplary embodiment of a pre-purification system 3 that purifies a flow of air for feeding to an air separation column 5 for separation of the air into oxygen and/or nitrogen flows as well as other flows (e.g. at least one waste flow, and/or argon flow, and/or xenon flow, and/or krypton flow, etc.). The ASU system 1 can be a plant or can be utilized in a plant that includes other industrial systems or processes.

As illustrated in FIG. 1, an exemplary embodiment of the ASU can be configured so that an intake flow 100 of air can be passed through a compressor system 103 to compress the air to a higher pre-selected pressure. The pressurized air can be output from the compressor system 103 and fed to a pre-purification unit (PPU) 107 of a pre-purification system 3 via a compressed air feed conduit. The PPU 107 can be configured to purify the compressed flow of air output from the compressor system 103 to remove impurities from the air. The PPU 107 can be configured as an adsorption system that is designed to remove undesired impurities from the air such as, for example, carbon dioxide ($CO_2$), carbon monoxide (CO), water ($H_2O$), hydrocarbons (e.g. C4+ hydrocarbons, acetylene, propylene, etc.), and nitrous oxide ($N_2O$), for example.

A cooler 104 can be positioned between the compressor system 103 and the PPU 107 to cool the compressed air to a temperature within a pre-selected PPU temperature or PPU temperature range before the compressed air is fed to the PPU 107. The cooler 104 can be (or include) a chiller, a mechanical chiller, an absorption chiller or another type of chiller or a different type of pre-PPU heat exchanger positioned between the PPU 107 and the compressor system 103.

The temperature of the compressed air output from the compressor system 103 can be in the range of 10° C.-25° C., 15° C.-30° C., or 5° C.-50° C. or yet another suitable range. The cooler 104 can be configured to cool this compressed air flow to the pre-selected PPU feed temperature that falls within a PPU feed temperature range. Examples of such a PPU feed temperature range include: 5° C.-15° C., 5° C.-20° C., or 10° C.-20° C. The PPU feed temperature range can also be another suitable range.

The cooled compressed air fed to the PPU can be at a cooled temperature within the pre-selected PPU feed temperature range. The PPU 107 can received this compressed feed air flow and subsequently purify the air to remove various undesired impurities (e.g. $CO_2$, water, $N_2O$, etc.)

The purified compressed air output from the PPU 107 can be fed to a main heat exchanger 109 via a heat exchanger feed conduit. Prior to being fed to the main heat exchanger 109, at least a portion of the air output from the PPU 107 can be fed to a booster compressor 108 for further compressing at least a portion of the purified, compressed air output from the PPU 107 to a higher pressure. In such embodiments, the entirety of the compressed purified air output from the PPU 107 can undergo further compression or the flow can be split so that a first portion of the compressed, purified air output from the PPU 107 is fed directly to the main heat exchanger 109 while a second portion of the air output from the PPU 107 is fed to the booster compressor to be further compressed to a higher pressure before that second portion is fed to the main heat exchanger 109.

A booster compressor feed conduit and booster compressor output conduit can be arranged to facilitate the feeding of fluid to the booster compressor 108 from the PPU 107 and the output of the further compressed air from the booster compressor 108 to the main heat exchanger 109. In other embodiments, the booster compressor 108 and its related conduits may not be utilized and an entirety of the air output from the PPU 107 can be fed to the main heat exchanger 109 via a main heat exchanger feed conduit.

The main heat exchanger 109 can be configured to cool the compressed, purified air. The cooling can be provided via one or more flows of fluid output from the air separation column 5. For example, one or more flows of nitrogen fluid and/or oxygen fluid can be output from the air separation column 5 so that they are passed through the main heat exchanger 109 to function as a cooling medium for cooling the purified air. The flows of fluid from the air separation column 5 can include one or more flows of nitrogen and one or more flows oxygen (e.g. a flow of liquid oxygen (LOX)). These flows of fluid output from the air separation column 5 can be warmed by the compressed, purified air as they pass through the main heat exchanger 109. For example, in embodiments in which a LOX flow is fed to the main heat exchanger 109 as a cooling medium, this LOX flow may be heated so that it is output from the main heat exchanger 109 as a gaseous oxygen flow (GOX).

The cooled air can be output from the main heat exchanger 109 for being fed to the air separation column 5 via at least one air separation column assembly feed conduit. The first portion of the compressed, purified air can be fed to the high pressure column 111b. A portion of this first portion can be split to also form a third portion of feed air. This third portion can be output from the main heat exchanger 109 and fed to an expander 110 to reduce the pressure of the third portion and also reduce the temperature of this portion of the air. The third portion of air can then be fed from the expander 110 to the low pressure column 111a.

The second portion of the compressed and purified air (e.g. the portion that may be further compressed via the booster compressor 108) can be output from the main heat exchanger and fed to the low pressure column 111a as well.

In embodiments that do not utilize the booster compressor 108, this second portion of air may not be present. In such embodiments, if the third portion of air that is fed to the expander 110 via splitting of the first portion of the compressed purified air fed to the main heat exchanger 109 is utilized, this third portion can be considered a second portion of the air instead of a third portion.

The high pressure column 111b can be positioned to process the cooled first portion of the purified and pressurized air that is fed to the high pressure column 111b to form a first high pressure nitrogen-enriched vapor stream that is fed to the first reboiler-condenser 111c. In some embodiments, the high pressure nitrogen-enriched vapor stream can include 100-99 volume percent (vol. %) nitrogen or at least 95 vol. % nitrogen. In other embodiments, the high pressure nitrogen enriched vapor stream can include another concentration of nitrogen (e.g. at least 90% nitrogen, etc.).

A first high pressure oxygen-enriched stream can also be output from the high pressure column 111b as a fluid that is liquid, vapor, or a combination of liquid and vapor. In some embodiments, the high pressure oxygen-enriched stream can include 30-40 vol. % oxygen, and 1-3 vol. % argon, and the balance nitrogen (e.g. 69-57 vol. % nitrogen). Other embodiments can include other concentrations of oxygen, argon, nitrogen as well as other trace components.

The first high pressure nitrogen-enriched vapor stream can be fed to the reboiler-condenser 111c to from a high pressure condensate flow that can be split into multiple portions via a conduit arrangement that includes at least one valve or other flow splitting mechanism. For instance, a first portion of the high pressure condensate flow can be output from the first reboiler-condenser 121 and subsequently recycled back to the high pressure column 111b as a reflux stream via a reflux stream conduit.

A second portion of the high pressure condensate flow can be output from the reboiler-condenser 111c for being fed to a subcooler 115 via a subcooler feed conduit. The subcooler 115 can be a heat exchanger that cools the second portion of the high pressure condensate flow so that this second portion is at a lower temperature that is suitable for feeding to the low pressure column 111a as a nitrogen-enriched low pressure feed flow that is fed to the low pressure column 111a via a nitrogen-enriched low pressure feed conduit positioned between the subcooler 115 and the low pressure column 111a. The second portion of the high pressure condensate flow can be reduced in pressure for feeding to the low pressure column (e.g. via a valve of the nitrogen-enriched low pressure feed conduit or via a pressure reduction mechanism included in this conduit). The nitrogen-enriched low pressure feed can be a substantially nitrogen-enriched liquid feed (e.g. be entirely liquid, be at least 90% by volume liquid, be at least 80% by volume liquid, etc.).

The first high pressure oxygen-enriched stream can be fed to the subcooler 115 to undergo cooling. Alternatively, the first high pressure oxygen-enriched stream can forego such cooling via the subcooler 115. In some embodiments, the first high pressure oxygen-enriched stream can be passed through a high pressure oxygen-enriched stream conduit extending from the high pressure column 111b that is configured so that the high pressure oxygen-enriched stream output from the high pressure column 111b can be reduced in pressure via a pressure reduction mechanism (e.g. an expander, a valve, etc.) and subsequently fed to the low pressure column 111a as a substantially liquid oxygen-enriched feed to the low pressure column 111a.

Reflux for the low pressure column 111a can be provided via the nitrogen-enriched low pressure feed that is fed to the low pressure column 111a via a nitrogen-enriched low pressure feed conduit positioned between the subcooler 115 and the low pressure column 111a. As mentioned previously, this nitrogen-enriched low pressure feed can be formed via the second portion of the high pressure condensate flow output from the reboiler-condenser 111c. There can also be additional liquid provided via one or more of the oxygen-enriched feeds fed to the low pressure column 111a.

Column boil-up for the low pressure column 111a can also be formed via the reboiler-condenser 111c and can be fed to the low pressure column 111a such that the vapor within the low pressure column 111a flows in counter-current flow to the liquid fed to the low pressure column 111a (e.g. the nitrogen-enriched LP feed can flow downwardly as the rising vapor flows upwardly in the low pressure column 111a, etc.).

The low pressure column 111a can operate to output multiple separated flows of fluid. Some of these flows of fluid can be considered nitrogen waste streams, which can be predominantly comprised of nitrogen gas and/or nitrogen liquid (e.g. be at least one nitrogen-enriched waste stream). For example, the low pressure column 111a can operate to output an upper vapor waste stream and a first low pressure oxygen-rich liquid stream. In at least some embodiments, the low pressure column 111a can also output an upper nitrogen-rich vapor output stream (not shown), a first argon-enriched vapor stream (not shown), as well as one or more other output flows.

The upper vapor waste stream can be output from the low pressure column 111a and be fed to the subcooler 115 to function as a cooling medium therein for cooling the second portion of the high pressure condensate flow output from the reboiler-condenser 111c and fed to the subcooler 115 via the subcooler feed conduit. This waste vapor stream can then be output from the subcooler 115 and fed to the main heat exchanger 109 to function as a cooling medium therein before being output from the main heat exchanger 109 as a waste stream, which can be emitted to the atmosphere or used in the plant to which the ASU system 1 can be incorporated (e.g. for mixing with a flue gas or to pass through another heat exchanger of the plant etc.).

The first low pressure oxygen-rich liquid stream output from the low pressure column 111a can be fed to a pump 117 to increase the pressure of this flow before it is fed to the main heat exchanger 109 to function as a cooling medium. In some embodiments, this flow of low pressure oxygen-rich liquid can become a warmed oxygen-rich stream that can be output from the main heat exchanger as a GOX stream.

The PPU 107 can be arranged so that the compressed air output from the one or more compressors of the compressor system 103 can be fed to the adsorber(s) 200 of the PPU 107 via at least one conduit extending from the compressor system 103 or pre-PPU cooler 104 (when utilized) for purification of the air via one or more on-stream adsorbers 200 of the PPU 107. The PPU 107 can be arranged to purify this air before it is passed downstream into the ASU system 1 (e.g. to the air separation column 5 and main heat exchanger 109, etc.).

The compressed air can pass through adsorbent beds of each on-stream adsorber of the PPU 107 to provide purification of the compressed air. The purification that is performed can remove undesired components of the fluid stream such as ambient moisture, $CO_2$, $N_2O$, hydrogen, carbon monoxide, heavy hydrocarbon components etc. can be completely or partially removed. The purified air can be output from the PPU 107 to be fed to the main heat exchanger 109 as discussed above, for example.

Figure 2:
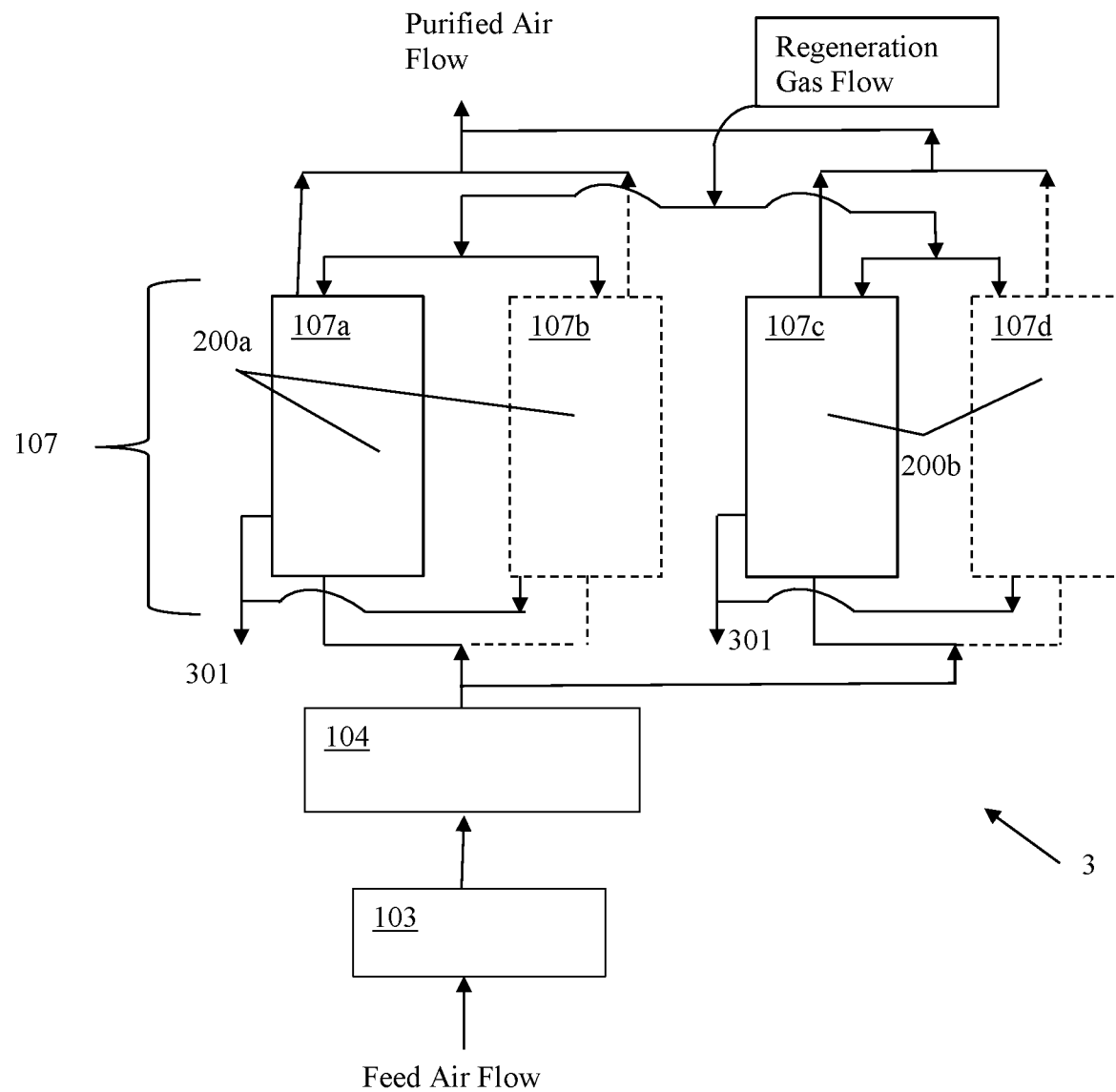
FIG. 2 is a schematic view of a first exemplary embodiment of a pre-purification system 3 having a pre-purification unit (PPU) that can be utilized in the first exemplary embodiment of the ASU system 1.
Figure 3:
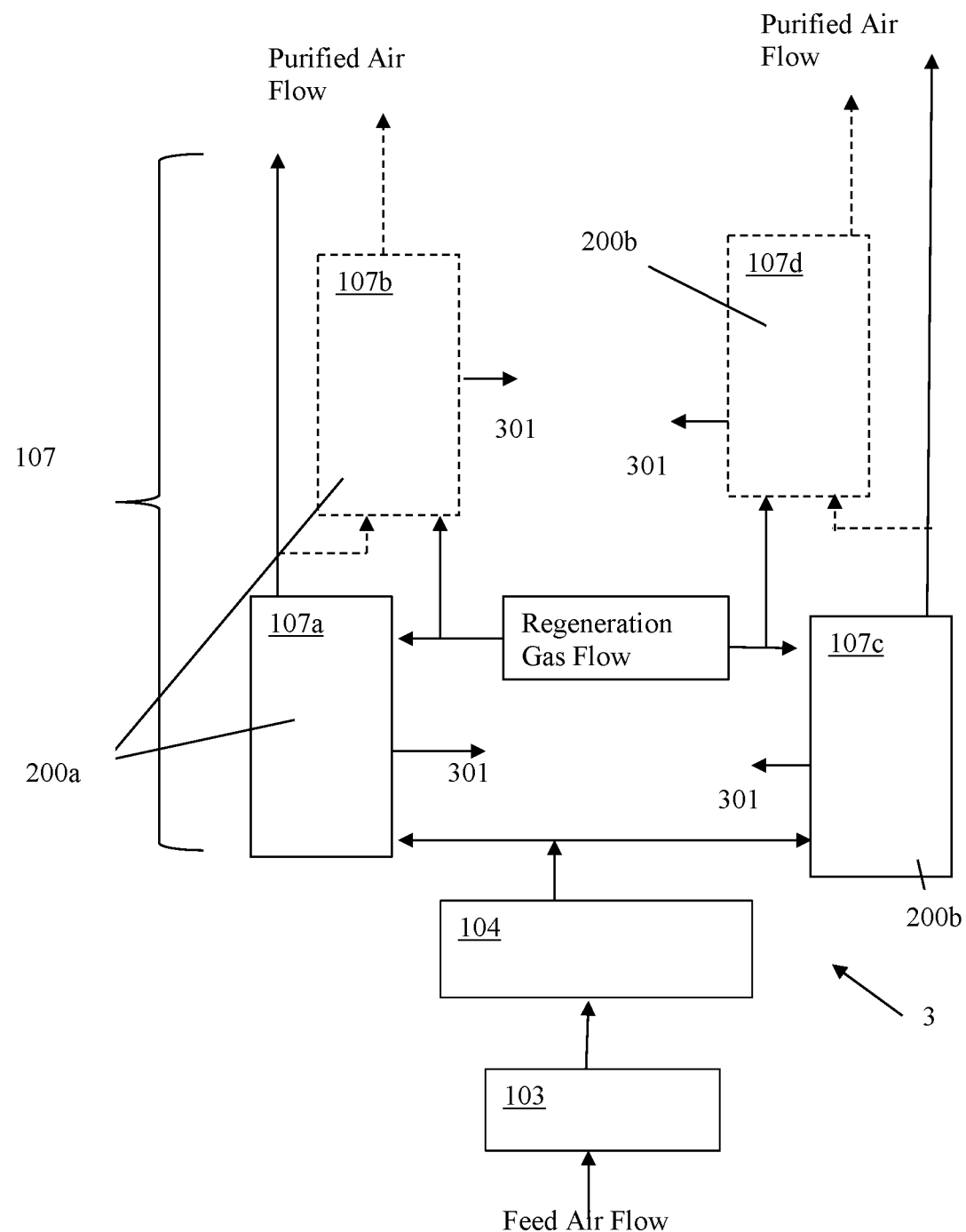
FIG. 3 is a schematic view of a second exemplary embodiment of a pre-purification system 3 having a PPU 107 that can be included in the first exemplary embodiment of the ASU system 1.

As may best be appreciated from FIGS. 2 and 3 the PPU 107 of the pre-purification system 3 can include multiple adsorbers 200. Each adsorber 200 of the PPU 107 can include one or more layers of adsorbent material that can remove multiple target elements from the compressed air fed to the PPU 107 via adsorption or reaction (e.g. catalyst material). The adsorbers of the PPU 107 can include a first set 200a of first adsorbers that include a first adsorber 107a and a second adsorber 107b. The first set 200a of first adsorbers can be a group of adsorbers that go online (or on-stream) and offline (or off-stream) together. When the first set 200a of adsorbers is online, at least one of the adsorbers in the first set 200a of adsorbers can be positioned in the flow path of the air for providing purification for the air depending on the operational capacity demands of the ASU system 1.

The PPU 107 can also include a second set 200b of adsorbers that can include a third adsorber 107c and a fourth adsorber 107d (which can also be referred to as a first adsorber of the second set of adsorbers and a second adsorber of the second set of adsorbers). The second set 200b of adsorbers can be a group of adsorbers that go online (or on-stream) and offline (or off-stream) together. The second set 200b of adsorbers can be arranged to go offline while the first set 200a is online and can be online while the first set 200a is offline. When the second set 200b of adsorbers is online, at least one of the adsorbers in the second set 200b of adsorbers can be positioned in the flow path of the air for providing purification for the air depending on the operational capacity demands of the ASU system 1.

It is contemplated that other embodiments of the pre-purification system 3 having a PPU 107 can be provided in which the first set 200a of adsorbers includes additional adsorbers (e.g. a fifth adsorber, a sixth adsorber, etc.) and the second set 200b of adsorbers can also include additional adsorbers (e.g. a seventh adsorber, an eighth adsorber, etc.).

The PPU 107 can be designed so that when the first set of adsorbers is on-line, the compressed feed air is passed through at least one of the on-line adsorbers of the first set of adsorbers and at least one of the off-line adsorbers of the second set of adsorbers undergo regeneration by having a regeneration gas passed through those off-line adsorbers to regenerate the adsorbent material within those off-line adsorbers. When the first set 200a of adsorbers are adjusted from an on-line state to an off-line state, the second set 200b of adsorbers can be adjusted from the off-line state to an on-line state so that at least one of the second set 200b of adsorbers receives compressed gas for purification of that gas while the first set 200a of adsorbers receive the regeneration gas for regeneration of the adsorbent material of those adsorbers.

It should be appreciated that when an adsorber 200 of the PPU 107 is in an off-stream state, it can undergo a regeneration process to regenerate the one or more layers of adsorbent material within the adsorber. When returned to the on-stream state, the adsorber can operate with improved efficiency due to the regeneration of the one or more layers of material (e.g. adsorbent material) as the regeneration of the material can return that material to a condition that is close to or at its original state for adsorption of target material from a fluid flow.

For at least some embodiments, the regeneration gas flow can pass through the vessel 203 of an absorber 200 along a flow path that is the reverse of the flow path 210 of fluid passed through the vessel of the adsorber when the adsorber is in the on-stream state. For such embodiments, the inlet 201 of the vessel during the on-stream state may function as an outlet for the regeneration gas through which the regeneration gas is output as an output regeneration gas flow 301 and the outlet 202 of the vessel during the on-stream state may function as an inlet for the regeneration gas.

For operation of the PPU 107, $CO_2$ can be utilized as a controlling component of the compressed air for monitoring of the purification of the compressed air. An analyzer or other type of sensor can be positioned to detect the $CO_2$ content of the purified air output from the PPU 107 to determine when the adsorbent material of the on-stream state adsorber(s) is saturated to trigger switching of the on-stream state adsorber(s) to an off-stream state while also switching the off-stream state adsorber(s) to the on-stream state. In some embodiments, the analyzer can be positioned in communication with an outlet 202 of an adsorber 200 or can be positioned in a conduit through which purified air passes as it is output from the PPU 107 and fed to the heat exchanger 109.

The switching of the on-stream state for a set of adsorbers and off-stream state of a set of adsorbers can be triggered in response to a detection of the $CO_2$ content of the purified air output from the PPU 107 being at or above a pre-selected threshold. In other embodiments, the concentration of a different impurity or the concentration of multiple different impurities within the purified air output from the PPU 107 can be utilized to trigger the switching of on-stream state and off-stream state adsorbers of the PPU 107.

The adsorbers 200 can each be configured as a radial adsorber, a vertical adsorber, a vertical cross flow adsorber, or a horizontal adsorber. In some arrangements, the adsorbers can be configured in such that the feed flow comes in from the bottom or the adsorber vessel and the output flow is output out the top of the vessel, or such that the feed flow comes in from the bottom of the vessel and the output flow is passed out of the bottom of the vessel. The PPU 107 can utilize an arrangement of adsorbers 200 so they are configured to utilize a thermal swing adsorption process and/or a pressure swing adsorption process.

Each adsorber 200 of the PPU 107 (e.g. first adsorber 107a, second adsorber 107b, third adsorber 107c, fourth adsorber 107d, etc.) can include a bed 221 of adsorbent material retained within a vessel that includes one or more layers of adsorbent material. A first adsorbent layer of a first bed 221 of adsorbent material can be configured via composition, layer thickness, particle size, pore volume, density, and/or chemical structure (e.g. how cations connect to the zeolite framework), etc. to selectively remove ambient moisture and can also remove $CO_2$ and/or other impurities and a second adsorbent layer of the first bed 221 can be configured via composition, layer thickness, particle size, pore volume, density, and/or chemical structure (e.g. how cations connect to the zeolite framework), etc. to selectively remove carbon dioxide ($CO_2$), nitrogen oxide ($N_2O$), heavy hydrocarbons and/or other fluid constituents from the compressed air fed to the PPU 107 when the adsorber 200 is in the on-stream state to purify air. In other embodiments, the adsorber vessel can have a single layer that can include adsorbent material or a combination of adsorbent materials for removal of moisture, $CO_2$, $N_2O$, heavy hydrocarbons and/or other fluid constituents from the compressed air fed to the PPU 107 when the adsorber 200 is in the on-stream state.

Figure 4:
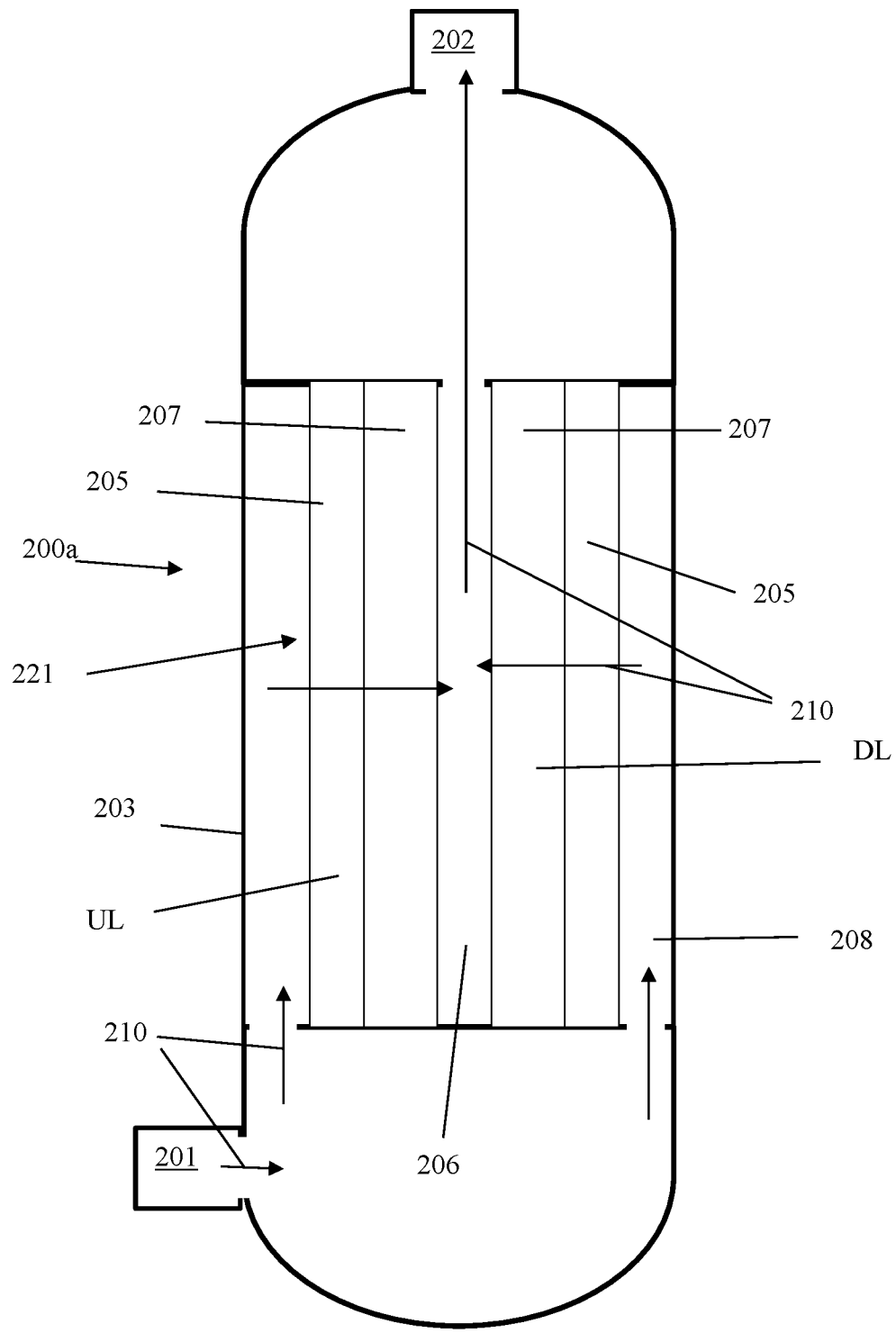
FIG. 4 is a schematic view of a first exemplary embodiment of an adsorber 200 that can be included in the PPU 107 of the pre-purification system 3 of the first exemplary embodiment of the ASU system 1. The exemplary adsorber 200 illustrated in FIG. 4 can be utilized in the first or second exemplary embodiment of the PPU 107 shown in FIGS. 2 and 3, for example.

Examples of adsorbers 200 that can be utilized in the PPU 107 are shown in FIGS. 4, 5, and 6 as non-limiting examples of different adsorbers that can be utilized in embodiments of the PPU 107. As can be seen from these exemplary adsorbers, the vessel 203 of an adsorber 200 can be structured so that the air to be purified passes through the vessel along a defined flow path 210 illustrated via arrows in FIGS. 4, 5, and 6 for passing between different adsorbent material regions of the chamber of the vessel 203 for passing through the layers of adsorbent material.

For example, as can be appreciated from FIGS. 4-5, the vessel of a radial adsorber 200 can be configured to utilize different flow paths and/or adsorbent bed configurations. The vessel can include an inlet 201 that receives compressed air to be purified via adsorption and an outlet 202. The inlet 201 can be positioned at a side of the vessel or at an inlet end of the vessel 203 at a head of the vessel 203. The outlet 202 can be at an end of the vessel or at a side of the vessel. The adsorbers 200 of the PPU 107 can have different configurations to define different flow paths 210 for the flow of air within the vessel 203 between the inlet 201 and the outlet 202.

For example, as may be appreciated from FIG. 4, the inlet 201 can be in fluid communication with an outer annular conduit structure 208 of the vessel and the outlet 202 can be in fluid communication with an inner conduit structure 206. For the embodiment shown in FIG. 4, the flow path 210 that can be defined within the vessel 203 of the adsorber 200 when operating in the on-stream state can include:
   (i) the air passing from the inlet 201 into the vessel 203 along a first flow segment of flow path 210,
   (ii) then the air passing through the first outer annular conduit 208 defining an initial fluid feed path for the air along a second flow segment of flow path 210,
   (iii) then the air passing through a first layer of material 205 along a third flow segment of flow path 210,
   (iv) then the air passing through a second layer of material 207 positioned downstream of the first layer 205 (e.g. above the first layer for vertical oriented vessels or positioned to a downstream side of the first layer downstream of the first layer for a horizontally oriented vessel) along a fourth flow segment of flow path 210,
   (v) then the air passed out of the second layer of material 207 to the first inner conduit 206 along a fifth flow segment of flow path 210, and
   (vi) then the air passing from the first inner conduit 206 to the outlet 202 along a sixth flow segment of flow path 210 for outputting purified air from the vessel 203 after that air has been passed through and contacted the first and second layers of material 205 and 207.

When the adsorber 200 is in the off-stream state and may undergo regeneration, the flow path within the vessel 203 can be reversed. The regeneration gas flow can pass into the vessel 203 via outlet 202, which functions as a regeneration gas flow inlet. The regeneration gas can then pass through the vessel along the reversed flow path and then exits the vessel 203 via the inlet 201, which functions as the regeneration gas flow outlet.

The first outer annular conduit 208 can have at least one inlet opening to receive air from the inlet 202 and least one outlet opening adjacent an outer side of the first layer of material 205 for passing fluid from the first outer annular conduit 208 to the first layer of material 205.

The first inner conduit 206 can be a conduit having an internal channel that is in fluid communication with one or more openings adjacent the inner side of the second layer of material 207 for receiving the air from that layer for outputting air from the second layer of material 207 to the outlet 202.

It should be understood that the first inner conduit 206 and the first outer annular conduit 208 can each be structured as conduit-type structures within the cavity or chamber of the vessel 203 that can each define a passageway for fluid (e.g. air) to guide the fluid along a flow segment of the flow path 210 within the cavity or chamber of the vessel 203. For example, the first outer annular conduit 208 can be defined to be an annular shape that extends between the inlet 201 and an outer side of the first layer of material 205 of the adsorbent material bed 221 to guide fluid from the inlet 201 to the first layer of material 205. The inner conduit 206 can be an inner conduit positioned to guide the air from an inner side of the second layer of material 207 of the adsorbent material bed 221 to the outlet 202.

The first layer of material 205 can be positioned within a first receptacle of the vessel 203 and include first material that differs from the second material of the second layer of material 207 retained within a second receptacle of the vessel 203. When the absorber operates in the on-stream state, the first layer of material 205 can be considered an upstream layer UL and the second layer of material 207 can be considered a downstream layer DL.

Each layer of material can be retained in a receptacle having one or more holes for permitting fluid to be passed into and out of the receptacle. The one or more holes can be defined by one or more screen elements of the receptacles in some embodiments. Each of the receptacles that retain a layer of material can include one or more screens, mesh, at least one plate having multiple holes, or at least one perforated membrane of material having a particular pre-selected geometry for defining at least a portion of the receptacle. Each receptacle can also be another type of receptacle structure that can retain a layer of material in a desired location within the vessel 203 while also allowing the air to pass into and out of the layer to fluidly connect the first outer conduit 208 with the first inner conduit 206 for passage of the air along the flow path 210.

Referring to FIG. 5, the vessel of the adsorber 200 can include a different internal configuration to define a different radial flow path 210 within the vessel 203. The embodiment of FIG. 5 can be a different type of radial adsorber than the embodiment of FIG. 4 such that the embodiment of FIG. 5 differs from the embodiment of FIG. 4.

For instance, the vessel 203 can include first inner conduit 206 and a first outer annular conduit 208 that defines a fluid flow path 210 within the vessel 203. It should be understood that the first inner conduit 206 and the first outer annular conduit 208 can each be structured as conduit-type structures within the vessel cavity that can each define a passageway for the air to guide the air along a flow segment of a flow path 210 within the cavity or chamber of the vessel 203.

For example, the first outer conduit 208 can be a conduit having an outer channel that is in fluid communication with openings adjacent an outer side of a first layer of material 205 for conveying air received from the inlet 201 to that first layer of material 205 of the bed 221 of adsorbent material. A downstream end of the first outer conduit 208 can be closed to help drive fluid received from inlet 201 adjacent a first head of the vessel into the first layer of material 205, which can be positioned within a receptacle that has one or more holes so that the first layer of material 205 is in fluid communication with the first outer conduit 208 and can receive air from the first outer conduit 208.

The receptacle of the first layer of material 205 can be positioned to enclose at least a portion of the first outer conduit 208. There can be one or more openings in the first outer conduit 208 in communication with the outer side of the first layer of material 205 so the air can pass out of the first outer conduit 208 and into the first layer of material 205. The one or more holes of the receptacle retaining the first layer of material 205 at its inner side and the one or more holes at its outer side can be perforations, tortious passageways defined in mesh of a screen of the receptacle, or can be other types of holes.

A first inner annular conduit 206 can have at least one inlet opening adjacent an inner side of the second layer of material 207 to receive air from that layer via one or more holes in the receptacle of the vessel 203 that retains the second layer of material 207. The one or more holes of the receptacle retaining the second layer of material 207 at its outer side and the one or more holes at its inner side can be perforations, tortious passageways defined in mesh of a screen, or other types of holes.

The first inner annular conduit 206 can also define a passageway to guide or transport the air output from the inner side of the second layer of material 207 retained within a second receptacle of the vessel 203 to the outlet 202. The second receptacle can have at least one hole at its inner side and at least one hole at its outer side to provide a fluidly communicative connection between the outer conduit 208 and the first inner annular conduit 206 via the first and second layers of material 205 and 207. The one or more holes of the second receptacle at its outer side and one or more holes at its inner side can be perforations, tortious passageways defined in mesh of a screen, or other types of holes.

The first and second receptacles that retain the first and second layers of material 205 and 207 can each be defined by or include one or more screens, mesh, at least one plate having multiple holes, at least one perforated membrane of material, or other type of receptacle structure that can retain a layer of material in a desired location within the vessel 203 while also allowing fluid to pass into and out of the layer. In some embodiments (e.g. some vertical and horizontal adsorber embodiments), there may not be a screen or other type of defined receptacle for separation of the layers.

It should be appreciated that when the vessel 203 is in its on-stream state, the first layer of material 205 can be considered an upstream layer of material UL and the second layer of material 207 can be considered a downstream layer of material DL.

There can be a flow path 210 of the vessel 203 that is configured for passing fluid between inner and outer regions of the chamber of the vessel 203 for passing through the layers of material of the bed 221 of the adsorbent material. It should be appreciated that the flow path 210 of the vessel 203 in the on-stream state can include:

(i) the fluid passing from the inlet 201 into the vessel 203 along a first flow segment of flow path 210,
(ii) then through the first outer conduit 208 defining an initial feed path for the air along a second flow segment of flow path 210,
(iii) then through a first layer of material 205 along a third flow segment of flow path 210,
(iv) then through the second layer of material 207 along a fourth flow segment of the flow path 210;
(v) then into the first inner annular conduit 206 for being transported to the outlet 202 along a fifth flow segment of flow path 210;
(vi) and then passed through the outlet 202 for being output from the vessel 203 along a sixth flow segment of the flow path 210.

When the adsorber 200 is in the off-stream state and may undergo regeneration, the flow path within the vessel 203 can be reversed. The regeneration gas flow can pass into the vessel 203 via outlet 202, which functions as a regeneration gas flow inlet. The regeneration gas can then pass through the vessel along the reversed flow path and then exits the vessel 203 via the inlet 201, which functions as the regeneration gas flow outlet.

It should be appreciated that each layer of material within the bed 221 of adsorbent material can be retained in a receptacle having one or more holes for permitting fluid to be passed into and out of the receptacle. The one or more holes can be defined by one or more screen elements of the receptacles in some embodiments. Each of the receptacles that retain a layer of material can include one or more screens, mesh, at least one plate having multiple holes, or at least one perforated membrane of material having a particular pre-selected geometry for defining at least a portion of the receptacle. Each receptacle can also be another type of receptacle structure that can retain a layer of material in a desired location within the vessel 203 while also allowing the air to pass into and out of the layer to fluidly connect the first inner conduit 206 with the first outer annular conduit 208 for passage of the air along the flow path 210. In yet other embodiments, the bed of material can be configured as a single layer of material.

Referring to FIG. 6, the vessel of the adsorber 200 can be configured as a vertical adsorber and can include a different internal configuration to define a different flow path 210 within the vessel 203. The exemplary embodiment of a vertical adsorber of FIG. 6 can be a different type of adsorber than the above discussed exemplary radial adsorbers of FIGS. 4 and 5.

The vessel 203 for the exemplary vertical adsorber 200 of FIG. 6 can include a bed 221 of adsorbent material that includes a single layer of material or multiple layers of material such as a first layer of material 205 and a second layer of material 207. A first receptacle retaining the first layer of material 205 and a second receptacle retaining the second layer of material 207 can be positioned within the chamber of the vessel 203. Each of the receptacles can include one or more holes at their downstream and upstream sides so the receptacles are in fluid communication with each other and the inlet 201 and the outlet 202 of the vessel 203 are in fluid communication. The one or more holes at each side of each receptacle retaining a respective layer of material can be one or more perforations, tortious passageways defined in mesh of a screen, or one or more other types of holes. The layers of material can be arranged so that air passes along a flow path 210 so that the air passes into the vessel 203 via the inlet 201 and then passes through the first layer of material 205 and then the second layer of material 207 before the air is passed out of the vessel 203 via the outlet 202 while the adsorber 200 is in the on-stream state.

When the adsorber 200 is in the off-stream state and may undergo regeneration, the flow path within the vessel 203 can be reversed. The regeneration gas flow can pass into the vessel 203 via outlet 202, which functions as a regeneration gas flow inlet. The regeneration gas can then pass through the vessel along the reversed flow path by passing through the second layer of material 207 and then the first layer of material 205 before the regeneration gas flow exits the vessel 203 via the inlet 201, which functions as the regeneration gas flow outlet.

Embodiments of the PPU 107 that can be utilized in the ASU system 1 can be configured to utilize multiple sets of adsorbers. When a first set 200a of adsorbers of the PPU 107 is on-line to provide purification, a second set 200b of adsorbers of the PPU 107 can be off-line to undergo regeneration. In such embodiments, a first adsorber 107a of the first set 200a of adsorbers (e.g. first adsorber 107a) can always be online and the second adsorber 107b of the first set 200a of adsorbers can be adjusted between being on-line and off-line depending on whether the PPU 107 is operating at the first operational capacity (e.g. second adsorber 107b is not on-line and not used to provide purification) or the second operational capacity (e.g. second adsorber 107b is on-line and utilized to provide purification). When the second set 200b of adsorbers is on-line and the first set 200a of adsorbers is off-line, the first set 200a of adsorbers can undergo regeneration and the second set 200b of adsorbers can be used to purify air so that a first adsorber of the second set of adsorbers (e.g. third adsorber 107c) is always on-line and the second adsorber of the second set 200b of adsorbers (e.g. fourth adsorber 107d) is brought online when the PPU is operating within the second pre-selected operational capacity (e.g. in excess of the first pre-selected operational capacity) and is not utilized for purification when the PPU is operating at the first pre-selected operational capacity.

FIGS. 2 and 3 illustrate exemplary embodiments of the PPU 107 and exemplary operation of the adsorbers of the PPU 107 for adjusting between use and non-use of at least one second adsorber of an on-line set of adsorbers depending on an operational capacity that the PPU is to be run at will be further discussed below. The use of the second adsorber in each set of adsorbers when on-line is indicated in FIGS. 2 and 3 via broken line illustration to help visually distinguish the first operational capacity operation of the PPU and the second operational capacity of the PPU 107.

As noted above, the exemplary adsorbers of FIGS. 4, 5, and 6 can be utilized in embodiments of the PPU 107 shown in FIGS. 2 and 3. For example the first adsorber of each set of adsorbers of the PPU 107 can be a radial adsorber (e.g. the adsorber of FIG. 4 or FIG. 5) and the second adsorber of each set of adsorbers can be a vertical adsorber (e.g. adsorber of FIG. 6). Alternatively, the first adsorber in each set of adsorbers can be a vertical adsorber and the second adsorber of each set of adsorbers of the PPU 107 can be a radial adsorber. As yet another alternative example, the first adsorber of each set of adsorbers of the PPU 107 can be a horizontal adsorber or a vertical cross flow adsorber and the second adsorber of each set of adsorbers of the PPU 107 can be a vertical adsorber or a radial adsorber. In yet other embodiments the first adsorber in each set of adsorbers of the PPU 107 can be a radial adsorber of a first size and a first purification capacity and the second adsorber of each set of adsorbers of the PPU 107 can be another radial adsorber having a second size that is smaller than the first size or a second purification capacity that is smaller than the first purification capacity.

Referring to FIG. 2, an embodiment of the PPU can utilize an embodiment of a PPU operational control method in which adsorbers for each set of adsorbers of the PPU can operate in parallel when the operational capacity demand for the PPU increases in excess of a first pre-selected operational capacity. In the event the operational demand for the ASU system 1 and/or PPU 107 is increased above the normal operational condition (e.g. operational capacity is to be increased beyond a first pre-selected operational capacity), the PPU 107 can be run so that a second adsorber of the on-line set of adsorbers is brought online to provide additional purification capacity to account for the increased operational capacity (e.g. a higher flow rate of air being fed into the ASU system 1 beyond a first level that corresponds to the first pre-selected operational capacity).

The first pre-selected operational capacity can be defined so that most of the time the ASU system 1 is operated the PPU provides air purification within the first pre-selected operational capacity. For example, the first pre-selected operational capacity can be defined so that it corresponds to the ASU system 1 operating at up to 90% of its operational capacity (e.g. from 0% to 90% of its operational capacity), up to 80% of its operational capacity (e.g. from 0% to 80% of its operational capacity) or up to 70% of its operational capacity (e.g. from 0% to 70% of its operational capacity). The second pre-selected operational capacity can be defined as being an operational capacity that is greater than the first pre-selected operational capacity (e.g. greater than 70% to 100% operational capacity, greater than 80% to 100% operational capacity, greater than 90% to 100% operational capacity, etc.).

In response to detection of the ASU system 1 being run at a capacity level that is increased to a level beyond the first pre-selected operational capacity (e.g. it is within the second pre-selected operational capacity), the PPU 107 can be adjusted so that the air feed fed to the PPU 107 is split so that a first portion passes to the first adsorber 107a of the first set 200a of adsorbers and a second portion passes to the second adsorber 107b of the first set 200a of adsorbers (e.g. via the flow path shown in broken line in FIG. 2). The splitting of the flow of air can be provided via a valve of the adsorber feed conduit or other flow dividing mechanism. The extent to which the flow is divided can be controlled by a controller communicatively connected to the valve or other flow dividing mechanism to adjust the splitting of the flow to a pre-determined flow splitting range. For example, the second adsorber 107b, when utilized to address the increased capacity, can be fed 10%-20% of the overall air feed fed to the PPU 107 so that the first adsorber 107a purifies a majority of the air feed (e.g. 90%-80% of the overall air feed fed to the PPU 107 for purification may be purified by the first adsorber 107a). As another example, the feed air flow can be split so that the second adsorber 107b can receive between 10% and 40% of the air feed fed to the PPU 107 while the majority of the air feed is still fed to the first adsorber 107a (e.g. between 90% and 60% of the overall air flow may be fed to the first adsorber 107a). The uneven splitting of air feed for purification can permit the first set 200a of adsorbers to operate in parallel, permit the second adsorber 107b to be of a smaller size or capacity as it may treat a smaller overall flow rate of air, and also permit the splitting of the air flow to be controlled more simply as an even split of the air flow would not be required for the parallel operation of the first set of adsorbers when the PPU 107 is operating above the first pre-selected operational capacity.

When operation of the ASU system 1 is reduced back to within the first operational capacity, the splitting of the air flow can be stopped and the controller can actuate the valve or other flow splitting mechanism so that air is no longer fed to the second adsorber 107b so that this adsorber is no longer utilized to purify any air and the entirety of the air flow fed to the PPU is again treated by only the first adsorber 107a.

Over time, the first set 200a of adsorbers may need to undergo regeneration due to loss of purification capacity. When that is detected (e.g. after a set on-stream feed flow time period has elapsed to indicate regeneration is needed), the PPU 107 can be operated to bring the second set 200b of adsorbers online to replace the first set 200a of adsorbers, which can be adjusted to an off-line state to undergo the regeneration process. When the second set 200*b* of adsorbers is brought online and the PPU is operating within the first pre-selected operational capacity, the entirety of the air fed to the PPU 107 can be fed to the third adsorber 107*c* (which can be considered the first adsorber of the second set 200*b* of adsorbers).

In response to detection of the ASU system 1 being run at a capacity level that is increased to a level beyond the first pre-selected operational capacity (e.g. it is within the second pre-selected operational capacity), the PPU 107 can be adjusted so that the air feed fed to the PPU 107 is split so that a first portion passes to the third adsorber 107*c* of the second set 200*b* of adsorbers and a second portion passes to the fourth adsorber 107*d* (which can be considered the second adsorber of the second set 200*b* of adsorbers) (e.g. via the flow path shown in broken line in FIG. 2).

The splitting of the flow of air can be provided via a valve of the adsorber feed conduit or other flow dividing mechanism. The extent to which the flow is divided can be controlled by a controller communicatively connected to the valve or other flow dividing mechanism to adjust the splitting of the flow to a pre-determined flow splitting range. For example, the fourth adsorber 107*d*, when utilized to address the increased capacity, can be fed 10%-20% of the overall air feed fed to the PPU 107 so that the third adsorber 107*c* purifies a majority of the air feed (e.g. 90%-80% of the overall air feed fed to the PPU 107 for purification may be purified by the third adsorber 107*c*). As another example, the feed air flow can be split so that the fourth adsorber 107*d* can receive between 10% and 40% of the air feed fed to the PPU 107 while the majority of the air feed is still fed to the third adsorber 107*c* (e.g. between 90% and 60% of the overall air flow may be fed to the third adsorber 107*c*). The uneven splitting of air feed for purification can permit the second set 200*b* of adsorbers to operate in parallel, permit the fourth adsorber 107*d* to be of a smaller size or capacity as it may treat a smaller overall flow rate of air, and also permit the splitting of the air flow to be controlled more simply as an even split of the air flow would not be required for the parallel operation of the second set 200*b* of adsorbers when the PPU 107 is operating above the first pre-selected operational capacity. This arrangement can also permit the second adsorber to be different from the first adsorber in other ways beyond purification capacity (e.g. it can be a vertical adsorber while the first adsorber is a radial adsorber as mentioned above, etc.).

When operation of the ASU system 1 is reduced back to within the first operational capacity, the splitting of the air flow can be stopped and the controller can actuate the valve or other flow splitting mechanism so that air is no longer fed to the fourth adsorber 107*d* so that this adsorber is no longer utilized to purify any air and the entirety of the air flow fed to the PPU is again treated by only the third adsorber 107*c*. When it is determined that the third adsorber 107*c* and/or fourth adsorber 107*d* needs to undergo regeneration, the first set 200*a* of adsorbers can be brought back into the on-line state and the second set 200*b* of adsorbers can be adjusted to the off-line state so they can undergo regeneration (e.g. receive regeneration gas flow, etc. as discussed above).

As may be appreciated from FIG. 3, the PPU 107 can be alternatively configured so that the adsorbers of the first and second sets of adsorbers can operate in series when the ASU system 1 is to operate at a capacity that is above the first pre-selected operational capacity. In such embodiments, an entirety of the air feed fed to the PPU 107 can be passed through all the adsorbers for the set of adsorbers that is in the on-line state when the ASU system is operating at an elevated operational capacity that is greater than the first pre-selected operational capacity.

For example, in response to detection of the ASU system 1 being run at a capacity level that is increased to a level beyond the first pre-selected operational capacity (e.g. it is within the second pre-selected operational capacity), the PPU 107 can be adjusted so that the air flow passing through the PPU 107 is adjusted so that, after the air is output from the first adsorber 107*a* of the first set 200*a* of adsorbers, the air is then fed to the second adsorber 107*b* to undergo additional purification before being output from the PPU 107 as a purified air flow. To provide such an adjustment in the air flow passing through the PPU (e.g. via the flow path shown in broken line in FIG. 3) a valve of the PPU conduit or other flow adjustment mechanism can be actuated to adjust the air flow so that air output from the first adsorber is passed to the second adsorber 107*b* before that flow is output from the PPU 107 toward the main heat exchanger 109 or other downstream element of the ASU system 1. A controller communicatively connected to the valve or other flow adjustment mechanism can be actuated to adjust the flow of air passing through the PPU so that the air output from the first adsorber 107*a* is subsequently fed in series to the second adsorber 107*b*. The adjustment of the air flow within the PPU 107 so that the second adsorber 107*b* is utilized to provide further purification in series with the first adsorber 107*a* downstream of the first adsorber 107*a* can permit the first set 200*a* of adsorbers to operate in series, permit the second adsorber 107*b* to be of a smaller size or capacity as it may have to effectively treat lower concentrations of impurities within the air that is at least partially purified via the first adsorber 107*a*, and can also permit the adjustment of the air flow to be controlled more simply as compared to requiring the flow to be split for parallel operation of the adsorbers. This arrangement can also permit the second adsorber to be a different type of adsorber (e.g. it can be a vertical adsorber while the first adsorber is a radial adsorber as mentioned above, etc.).

When operation of the ASU system 1 is reduced back to within the first operational capacity, the air flow with the PPU 107 can be readjusted so that the flow of air to the second adsorber 107*b* can be stopped and the controller can actuate the valve or other flow adjustment mechanism so that air is no longer fed to the second adsorber 107*b* so that this adsorber is no longer utilized to purify any air and the entirety of the air flow fed to the PPU is again treated by only the first adsorber 107*a*.

Over time, the first set 200*a* of adsorbers may need to undergo regeneration due to loss of purification capacity. When that is detected, the PPU 107 can be operated to bring the second set 200*b* of adsorbers online to replace the first set 200*a* of adsorbers, which can be adjusted to an off-line state to undergo the regeneration process. When the second set 200*b* of adsorbers is brought online and the PPU is operating within the first pre-selected operational capacity, the entirety of the air fed to the PPU 107 can be fed to the third adsorber 107*c* (which can be considered the first adsorber of the second set 200*b* of adsorbers).

In response to detection of the ASU system 1 being run at a capacity level that is increased to a level beyond the first pre-selected operational capacity (e.g. it is within the second pre-selected operational capacity), the PPU 107 can be adjusted so that the air feed fed to the PPU 107 is adjusted so that the at least partially purified air output from the third adsorber 107*c* of the second set 200*b* of adsorbers is passed through the fourth adsorber 107*d* (which can be considered the second adsorber of the second set 200*b* of adsorbers)

before the PPU 107 outputs the treated air flow as a purified air flow (e.g. the flow path can be adjusted for utilization of the exemplary flow path shown in broken line in FIG. 3).

The adjustment of the flow of air can be provided via a valve of the PPU air flow conduit or other flow adjustment mechanism, which can be controlled by a controller communicatively connected to the valve or other flow adjustment mechanism. The adjustment of the air flow within the PPU 107 can permit the second set 200*b* of adsorbers to operate in series, permit the fourth adsorber 107*d* to be of a smaller size or capacity as it may treat a smaller impurity concentration within the air output from the third adsorber 107*c*, and also permit the adsorbers to be operated more simply as a splitting of the air flow would not be required for parallel operation of the second set 200*b* of adsorbers when the PPU 107 is operating above the first pre-selected operational capacity. It can also permit the fourth adsorber 107*d* to be a different type of adsorber from the third adsorber 107*c* (e.g. the fourth adsorber 107*d* can be a vertical adsorber while the third adsorber 107*c* may be a radial adsorber, the fourth adsorber 107*d* can be a different type and size of radial adsorber, etc.)

When operation of the ASU system 1 is reduced back to within the first operational capacity, the air flow within the PPU 107 can be adjusted so air flow is no longer fed to the fourth adsorber 107*d*. The controller can actuate the valve or other flow adjustment mechanism so that air is no longer fed to the fourth adsorber 107*d* so that this adsorber is no longer utilized to purify any air and the entirety of the air flow fed to the PPU is again treated by only the third adsorber 107*c*. When it is determined that the third adsorber 107*c* and/or fourth adsorber 107*d* needs to undergo regeneration, the first set 200*a* of adsorbers can be brought back into the on-line state and the second set 200*b* of adsorbers can be adjusted to the off-line state so they can undergo regeneration (e.g. receive regeneration gas flow, etc. as discussed above).

In yet other embodiments, the PPU can be arranged to utilize the same supplemental adsorber for addressing the increased operational capacity of the ASU system 1 at a level that exceeds the first pre-selected operational capacity. In such embodiments, the first set 200*a* of adsorbers and the second set 200*b* of adsorbers can share a common supplement adsorber in which a flow of air is fed to the supplemental adsorber in response to the operational capacity increasing beyond the first pre-selected operational capacity. This adjustment can occur so that the supplemental adsorber processes an entirety of the air flow after it is output from the first on-line adsorber so it operates in series with the on-line adsorber or it can receive a portion of the air flow fed to the PPU 107 while the on-line adsorber still receives a majority of the air fed to the PPU for treating that air fed to the PPU in a parallel flow arrangement (e.g. the supplemental adsorber may receive 10%-20% or 10%-40% of the overall air feed fed to the PPU while the primary on-line adsorber treats 90%-80% or 90%-60% of the overall air fed to the PPU 107). The adjustment of the air flow can also occur after the operational capacity drops back to within the first pre-selected operational capacity so that the supplemental adsorber is no longer utilized to treat any air fed to the PPU and only the primary online adsorber treats the air fed to the PPU 107.

In some embodiments, the first set 200*a* of adsorbers and the second set 200*b* of adsorbers can each be configured to remove certain pre-selected impurities out of the air fed to the adsorbers when those adsorbers are in the on-stream state. For example, the beds of material within these adsorbers can be composed for removal of a pre-selected set of impurities. In some embodiments, the first adsorber 107*a* can be configured to remove water, carbon dioxide ($CO_2$) and nitrous oxide ($N_2O$) from the air and the second adsorber 107*b* can be configured to remove carbon monoxide (CO) and hydrogen ($H_2$) from the air. In such embodiments, the third adsorber 107*c* can also be configured to remove water, $CO_2$ and $N_2O$ from the air and the fourth adsorber 107*d* can be configured to remove CO and $H_2$ from the air.

As another example, the first adsorber 107*a* can be configured to remove water, $CO_2$ and $N_2O$ from the air and the second adsorber can be configured to remove $CO_2$ and $N_2O$ remaining in the air output from the first adsorber 107*a*. In such embodiments, the third adsorber 107*c* can also be configured to remove water, $CO_2$ and $N_2O$ from the air and the fourth adsorber 107*d* can be configured to remove $CO_2$ and $N_2O$ remaining in the air output from the third adsorber 107*c*.

It should be appreciated that embodiments of the ASU system 1 and/or the pre-purification system 3 can utilize a controller to monitor and control operations of the system. For instance, embodiments of the ASU system shown in FIG. 1 and the embodiments of the exemplary pre-purification systems 3 of FIGS. 2-3 as well as other embodiments discussed herein can include a controller such as the exemplary controller shown in FIG. 7. Temperature sensors, pressure sensors, flow sensors, and concentration sensors configured to detect a concentration of one or more compounds (e.g. $O_2$, Ar, $CO_2$, $N_2$, Xe, Kr, CO, water, etc.) can be included for sensing and/or detecting flow rates, concentrations, temperatures or pressures of fluid flowing through different elements or units of the plant and/or conduits between those units. For example, there can be sensors positioned to detect (i) the air flow rate, pressure, temperature and feed concentrations for the air fed to the compressor system 103, (ii) flow rate, pressure, temperature and/or feed concentrations of the air output from the compressor system 103 for feeding to one or more adsorbers of the PPU 107 (*iii*) flow rate, pressure, temperature and feed concentrations of the air output from the PPU 107 for feeding to the heat exchanger 109, and/or (iv) the flow rate, pressure, temperature and constituent concentrations of the fluid fed to and/or output from the multiple column assembly 111. There can also be other sensors positioned in the ASU system 1 to monitor and control the operations of these elements of the system. A controller can be provided to receive data from these sensors and adjust operations of different elements based on the received sensor data. An example of such a controller can be seen in FIG. 7, and can include a processor connected to a non-transitory computer readable medium and at least one interface for communications with the sensors. The processor can run at least one automated control program stored in the computer readable medium (e.g. non-transitory memory, flash memory, etc.) that defines a method for controlling the operation of the ASU system 1, PPU 107, and/or one or more elements of the pre-purification system 3.

It should be appreciated that embodiments of the controller can also be configured to utilize other sensor data to actuate different plant operations and use of different conduits for different flow paths of fluid to and from different elements. In some embodiments, the controller can be connected to a display, and at least one input device and/or input/output device to facilitate output of data to a user or operator and receipt of input from an operator. For instance, the controller can be connectable to an operator work station or a computer of an operator of the plant. The controller can also be connected to other plant control elements for incorporation into a larger automated process control system for the plant.

An exemplary method of purifying air via a PPU 107 of an ASU system 1 can be appreciated from FIG. 8. Embodiments of the controller shown in FIG. 7 can be designed and adapted to run at least one automated control program to facilitate implementation of the method of FIG. 8 in the ASU system of FIG. 1 or the pre-purification systems 3 of FIG. 2 or FIG. 3.

For instance, as shown in FIG. 1, a first step S1 of the method can include passing air through a first adsorber 200 of the PPU 107 to pass the air through a bed 221 of adsorbent material within a vessel 203 of the adsorber 200 during operation of the ASU system 1 that is at or below the first operational capacity threshold. In response to determining the operation of the ASU system 1 is needed to be adjust to a second operational capacity threshold that is above the first operational capacity threshold, the flow of compressed air can be adjusted so that a first portion of the air is passed to the first adsorber 200 and a second portion of the air is passed to the second adsorber 200 or so that the air output from the first adsorber 200 is also passed through a second adsorber 200 before being output as purified air in a second step S2. As discussed herein, the second adsorber can be different than the first adsorber (e.g. by type, size, purification capacity, etc.).

In response to determining that the operation of the ASU system 1 can be reduced to below the first operational capacity threshold or at the first operational threshold, the flow of air can be adjusted in a third step S3 so that the air is passed through the first adsorber and is no longer passed through the second adsorber until the operational capacity of the ASU needs to be adjusted to a level above the first operational capacity threshold and at or below a second higher operational capacity threshold. The method can then pass back to the first step S1 mentioned above and repeat as often as may be necessary.

It should be appreciated that embodiments of the method can include other steps. For example, the method can also include switching the feeding of air from a first set 200a of adsorbers to a second set of adsorbers 200b so that the first set of adsorbers is adjusted to an off-line state and the second set of adsorbers is adjusted to an on-line state and vice versa. As another example, the method can also include passing regeneration gas through the set of adsorbers in the off-line state. As yet another example, the method can include increasing a flow rate of feed air for feeding to the PPU by increasing the compression system's rate of operation or by actuating a second compression system to provide additional air flow for feeding to the PPU 107.

The steps S1-S3 of the method can also be utilized in a method of retrofitting a pre-existing ASU system to include an embodiment of the pre-purification system 3 (e.g. the exemplary embodiments shown in FIGS. 2 and 3 or other embodiment discussed herein, etc.). A PPU can be retrofitted with at least one secondary adsorber for use when the ASU system 1 being retrofitted operates above a first pre-selected operational capacity. In some embodiments, the retrofitting may include providing secondary adsorbers to create multiple sets of adsorbers for operation, for example. In other embodiments, a single secondary supplemental adsorber may be installed for use in conjunction with at least one on-line state adsorber when the operational capacity of the ASU system that is retrofitted is to be run at a level that is above a first pre-selected capacity value. Steps S1-S3 of the method (as well as other steps) can then be performed after the at least one secondary adsorber is installed.

It should be appreciated that modifications to the embodiments explicitly shown and discussed herein can be made to meet a particular set of design objectives or a particular set of design criteria. For instance, the arrangement of valves, piping, and other conduit elements (e.g. conduit connection mechanisms, tubing, seals, etc.) for interconnecting different units of the plant for fluid communication of the flows of fluid between different units can be arranged to meet a particular plant layout design that accounts for available area of the plant, sized equipment of the plant, and other design considerations. As another example, the flow rate, pressure, and temperature of the fluid passed through the radial adsorber as well as passed through other plant elements can vary to account for different plant design configurations and other design criteria. As yet another example, the number of adsorbers in the PPU 107 and how they are arranged can be adjusted to meet a particular set of design criteria. As yet another example, the material composition for the different structural components of the adsorbers 200, PPU 107, and ASU system 1 can be any type of suitable materials as may be needed to meet a particular set of design criteria. Embodiments can be utilized in conjunction with any type of adsorber—radial, vertical, horizontal, vertical cross flow, etc. for a PPU 107.

It should be appreciated that embodiments of the ASU system 1 can be configured as an air separation plant or be incorporated into another type of plant in which at least one adsorber 200 can be utilized. The plant. adsorption system, PPU 107, and the adsorber 200 can each be configured to include process control elements positioned and configured to monitor and control operations (e.g. temperature and pressure sensors, flow sensors, an automated process control system having at least one work station that includes a processor, non-transitory memory and at least one transceiver for communications with the sensor elements, valves, and controllers for providing a user interface for an automated process control system that may be run at the work station and/or another computer device of the plant, etc.).

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of the adsorber, adsorption system, PPU, plants having an adsorption system utilizing one or more of the adsorbers, ASU systems, and methods of making and using the same have been shown and described above, it is to be distinctly understood that the invention is not limited thereto but may be otherwise variously embodied and practiced within the scope of the following claims.

What is claimed is:

1. A method of operating a pre-purification unit (PPU) of an air separation unit (ASU) system, the method comprising:
   purifying air fed to the PPU via a first adsorber of the PPU while the ASU system operates within a first pre-selected operational capacity in which the air fed to the PPU is at a first feed rate that is at or below a first pre-selected feed rate; and
   in response to an increase in the operational capacity of the ASU system to a level that is above the first pre-selected operational capacity such that the air fed to the PPU is fed at a second feed rate that is above the first feed rate, purifying the air fed to the PPU via the first adsorber of the PPU and a second adsorber of the PPU, the second adsorber of the PPU being different from the first adsorber of the PPU.

2. The method of claim 1, wherein the first adsorber is a radial adsorber of a first purification capacity and the second adsorber is a vertical adsorber of a second purification capacity that is lower than the first purification capacity.

3. The method of claim 1, wherein the purifying of the air fed to the PPU via the first adsorber of the PPU and the second adsorber of the PPU comprises:
splitting a flow of air fed to the PPU so that a first portion of the air is fed to the first adsorber and a second portion of the air is fed to the second adsorber, the second portion being smaller than the first portion.

4. The method of claim 3, wherein the first portion is 60% to 80% of the flow of air fed to the PPU and the second portion is 40% to 20% of the flow of air fed to the PPU.

5. The method of claim 1, wherein the purifying of the air fed to the PPU via the first adsorber of the PPU and the second adsorber of the PPU comprises:
passing the air fed to the PPU to the first adsorber and subsequently passing at least partially purified air output from the first adsorber to the second adsorber to undergo further purification via the second adsorber such that the first adsorber and the second adsorber operate in series.

6. The method of claim 5, comprising:
adjusting a flow of air within the PPU so that air output from the first adsorber is fed to the second adsorber.

7. The method of claim 1, comprising:
increasing a flow rate of air fed to the PPU air fed to the PPU increases in flow rate from the first feed rate to the second feed rate via increasing an operational capacity of a first compression system of the ASU system.

8. The method of claim 1, wherein the PPU includes a first set of adsorbers that include the first adsorber and the second adsorber and also include a second set of adsorbers that include a third adsorber and a fourth adsorber, the method comprising:
passing regeneration gas through a second set of adsorbers while in an off-line state while the first set of adsorbers are in an on-line state.

9. The method of claim 1, comprising:
in response to a decrease in the operational capacity of the ASU system to a level that is at or below the first pre-selected operational capacity, adjusting flow of air fed to the PPU so that air is only fed to the first adsorber for purifying the air fed to the PPU via the first adsorber and the second adsorber no longer receives air for purifying the air while the operational capacity is at or below the first pre-selected operational capacity.

10. The method of claim 1, wherein:
the first adsorber is configured to remove one or more of water, carbon dioxide ($CO_2$), nitrous oxide ($N_2O$), and hydrocarbons from the air and the second adsorber is configured to remove one or more of carbon monoxide (CO) and hydrogen ($H_2$) from the air; or
the first adsorber is configured to remove one or more of water, $CO_2$, $N_2O$, and hydrocarbons from the air and the second adsorber is configured to remove one or more of $CO_2$ and $N_2O$ remaining in the air output from the first adsorber.

11. The method of claim 1, wherein the second adsorber of the PPU has a size that is smaller than a size of the first adsorber of the PPU.

12. The method of claim 1, wherein the second adsorber of the PPU has a smaller purification capacity than the first adsorber of the PPU.

13. The method of claim 12, wherein the second adsorber of the PPU has a size that is smaller than a size of the first adsorber of the PPU.

14. The method of claim 1, wherein the PPU includes a first set of adsorbers that includes the first adsorber and the second adsorber and also includes a second set of adsorbers that includes a third adsorber and a fourth adsorber, the method comprising:
passing regeneration gas through a second set of adsorbers while in an off-line state while the first set of adsorbers are in an on-line state;
adjusting the second set of adsorbers from the off-line state to an on-line state and adjusting the first set of adsorbers from the no-line state to the off-line state so that:
the air fed to the PPU is purified via the third adsorber of the PPU while the ASU system operates within a first pre-selected operational capacity in which the air fed to the PPU is at the first feed rate that is at or below the first pre-selected feed rate; and
in response to an increase in the operational capacity of the ASU system to a level that is above the first pre-selected operational capacity such that the air fed to the PPU is fed at a second feed rate that is above the first feed rate, purifying the air fed to the PPU via the third adsorber of the PPU and the fourth adsorber of the PPU, the fourth adsorber of the PPU being smaller in size or smaller in purification capacity than the third adsorber of the PPU; and
regeneration gas is passable to the first set of absorbers while the first set of adsorbers are in the off-line state and the second set of adsorbers are in the on-line state.

15. The method of claim 14, wherein
the first adsorber is a radial adsorber of a first purification capacity and the second adsorber is a vertical adsorber of a second purification capacity that is lower than the first purification capacity; and
the third adsorber is a radial adsorber of the first purification capacity and the fourth adsorber is a vertical adsorber of the second purification capacity that is lower than the first purification capacity.

16. The method of claim 14, wherein
the first adsorber has a first purification capacity and the second adsorber has a second purification capacity that is lower than the first purification capacity; and
the third adsorber has the first purification capacity and the fourth adsorber has the second purification capacity.

* * * * *